US010399788B2

(12) United States Patent
Suzuki

(10) Patent No.: US 10,399,788 B2
(45) Date of Patent: Sep. 3, 2019

(54) PALLET TRANSPORT DEVICE

(71) Applicant: NITTOKU ENGINEERING CO., LTD., Saitama-shi, Saitama (JP)

(72) Inventor: Ikuo Suzuki, Fukushima-ken (JP)

(73) Assignee: NITTOKU ENGINEERING CO., LTD., Saitama-Shi, Saitama (JP)

( * ) Notice: Subject to any disclaimer, the term of this patent is extended or adjusted under 35 U.S.C. 154(b) by 0 days.

(21) Appl. No.: 15/757,857

(22) PCT Filed: Aug. 31, 2016

(86) PCT No.: PCT/JP2016/075545
§ 371 (c)(1),
(2) Date: Mar. 6, 2018

(87) PCT Pub. No.: WO2017/043397
PCT Pub. Date: Mar. 16, 2017

(65) Prior Publication Data
US 2018/0334331 A1     Nov. 22, 2018

(30) Foreign Application Priority Data

Sep. 8, 2015   (JP) ................. 2015-176314
Aug. 10, 2016  (JP) ................. 2016-157247

(51) Int. Cl.
*B65G 35/06*   (2006.01)
*B23Q 7/14*    (2006.01)

(52) U.S. Cl.
CPC ........... *B65G 35/06* (2013.01); *B23Q 7/1447* (2013.01); *B65G 2201/0267* (2013.01)

(58) Field of Classification Search
CPC ...................................... B65G 35/06
USPC ....................... 198/597, 605, 606
See application file for complete search history.

(56) References Cited

U.S. PATENT DOCUMENTS

| 4,722,432 A    * | 2/1988 | Staton ............ B65G 47/848 198/438 |
| 10,062,600 B2 * | 8/2018 | Bluck ............ H01L 21/67173 |
| 2011/0100783 A1 | 5/2011 | Baba |
| 2015/0170947 A1 | 6/2015 | Bluck et al. |

FOREIGN PATENT DOCUMENTS

| GB | 905185 A  * | 9/1962 | ......... B65G 47/487 |
| JP | 2011-93032 A | 5/2011 | |

* cited by examiner

*Primary Examiner* — Gene O Crawford
*Assistant Examiner* — Lester Ill Rushin
(74) *Attorney, Agent, or Firm* — Rabin & Berdo, P.C.

(57) ABSTRACT

A pallet transport device includes a plurality of pallet rails; a pallet feeding unit configured to transport the pallet along the pallet rails; a pallet moving unit configured to horizontally rotate so as to move the pallet; one or more short rails disposed at a periphery of the pallet moving unit; a pallet feeding assist unit configured to move the pallet from the pallet rails to the short rails, or move the pallet from the short rails to the pallet rails; and an elevator unit configured to cause the pallet feeding assist unit to descend and ascend. The horizontal rotation of the pallet moving unit is permitted by the descent of the pallet feeding assist unit.

10 Claims, 16 Drawing Sheets

PALLET TRANSPORT DEVICE

TECHNICAL FIELD

The present invention relates to a pallet transport device that transports workpieces and the like placed on a plurality of pallets by circulating the pallets on a track shaped path.

BACKGROUND ART

There are transport devices that, on a production line, transport a workpiece and cause a machine tool at a transport destination to apply predetermined processing to the workpiece. JP 201-93032A discloses a pallet transport device that transports a plurality of pallets, which allow workpieces to be placed thereon, so as to circulate the pallets toward a machine tool on a track shaped path composed of two linear portions and two curved lines that connect between the linear portions.

This transport device includes first and second pallet rails that extend in parallel to each other, first and second pallet feeding means for transporting the pallets along the first and second pallet rails, and pallet moving means for moving the plurality of pallets from an edge of the first or second pallet rail to the second or first pallet rail. The pallet moving means move on a semicircular path between two positions that face each of the both end portions of the first and second pallet rails.

In such a circulation-type pallet transport device, the pallets are transported by the first or second pallet feeding means while being placed on the first or second pallet rail, and then moved from the edge of the first or second pallet rail by the pallet moving means on a semicircular path. The pallets are connected to the edge of the second or first pallet rail, moved to the second or first pallet rail by the second or first pallet feeding means, and placed on the second or first pallet rail again. In this way, the plurality of pallets are circulated on a track shaped path.

SUMMARY OF INVENTION

The foregoing pallet transport device includes the first and second pallet feeding means for transporting the pallets along the first and second pallet rails.

Meanwhile, in the foregoing pallet transport device, the pallet moving means need to move the pallets from the end portions of the first and second pallet rails on a semicircular path. Therefore, the pallet feeding means are not permitted to engage with a pallet that has reached the end portions of the first and second pallet rails, and the pallet moving means require a structure that can reliably move the pallets from the end portions of the first and second pallet rails on a semicircular path.

That is, although the pallet feeding means in the foregoing pallet transport device transport the pallets along the pallet rails, once a pallet has reached the end portions of the pallet rails, the engagement between the pallet and the pallet feeding means is broken, and the pallet feeding means cannot move the pallet again.

However, the pallet feeding means, which cannot move the pallet that has reached the end portions of the first and second pallet rails, cannot move the pallet from the vicinity of the edge of the second or first pallet rail to the second or first pallet rail again, either. This creates the problem that the circulation of pallets on a track shaped path is difficult, which is yet to be solved.

Specifically, with the foregoing pallet transport device, it is difficult to move the pallets from the end portion of one pallet rail, and to move the pallets from the vicinity of the edge of the other pallet rail to the other pallet rail again.

The present invention aims to provide a pallet transport device that is capable of reliably moving a pallet from the end portion of one pallet rail, and moving a pallet from the vicinity of the edge of the other pallet rail to the other pallet rail again.

According to one aspect of the present invention, a pallet transport device includes a plurality of pallet rails configured to allow a pallet to be movably placed thereon; a pallet feeding unit configured to transport the pallet along the pallet rails; a pallet moving unit disposed at end portions of the plurality of pallet rails, the pallet moving unit being configured to horizontally rotate so as to move the pallet placed on any one of the plurality of pallet rails to the other pallet rail; one or more short rails disposed at a periphery of the pallet moving unit; a pallet feeding assist unit configured to move the pallet from the pallet rails to the short rails, or move the pallet from the short rails to the pallet rails; and an elevator unit configured to cause the pallet feeding assist unit to descend and ascend. The horizontal rotation of the pallet moving unit is permitted by the descent of the pallet feeding assist unit.

DESCRIPTION OF EMBODIMENTS

The following describes an embodiment of the present invention with reference to the attached drawings.

Figure 1:
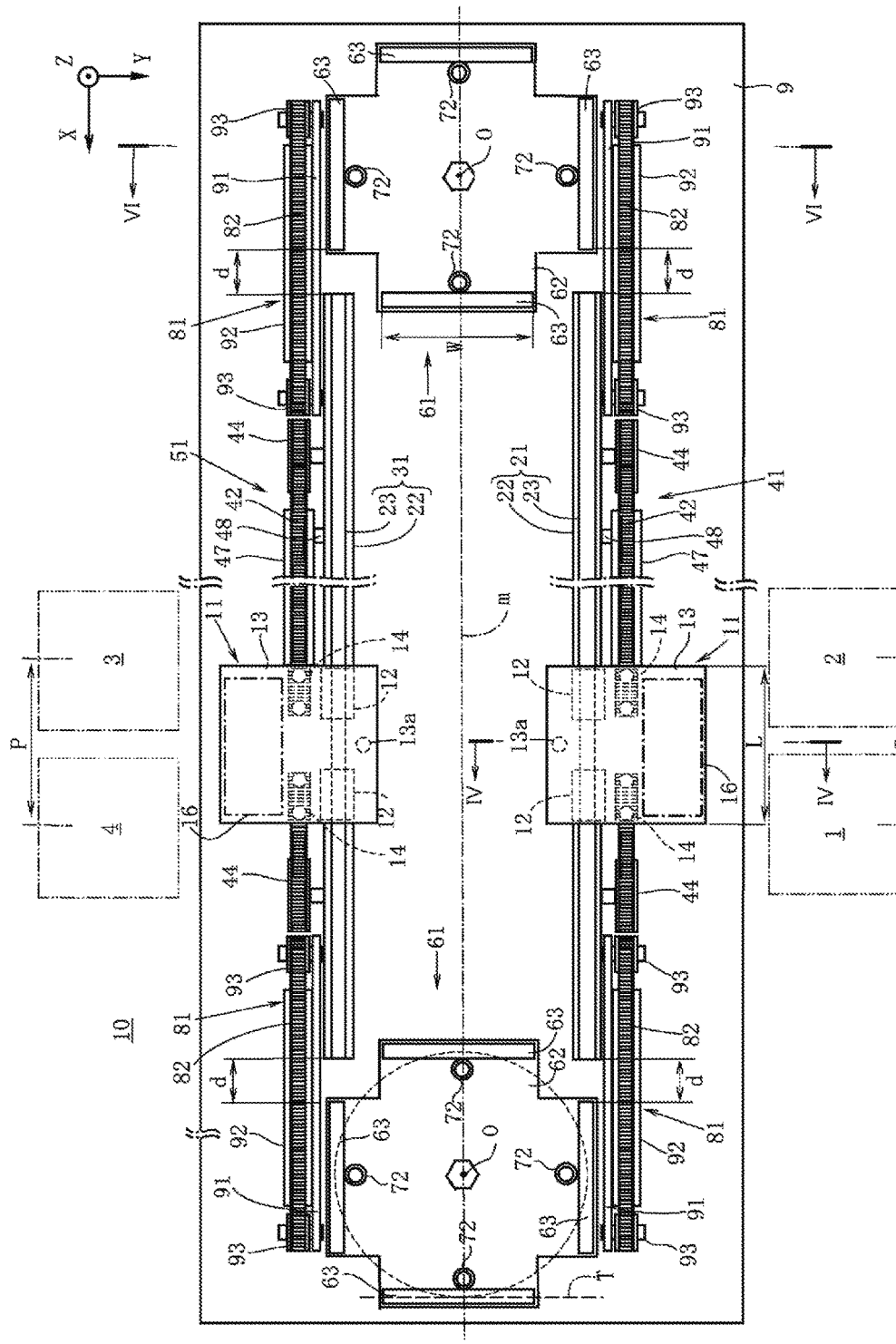
FIG. 1 is a plan view of a pallet transport device according to an embodiment of the present invention.
Figure 2:
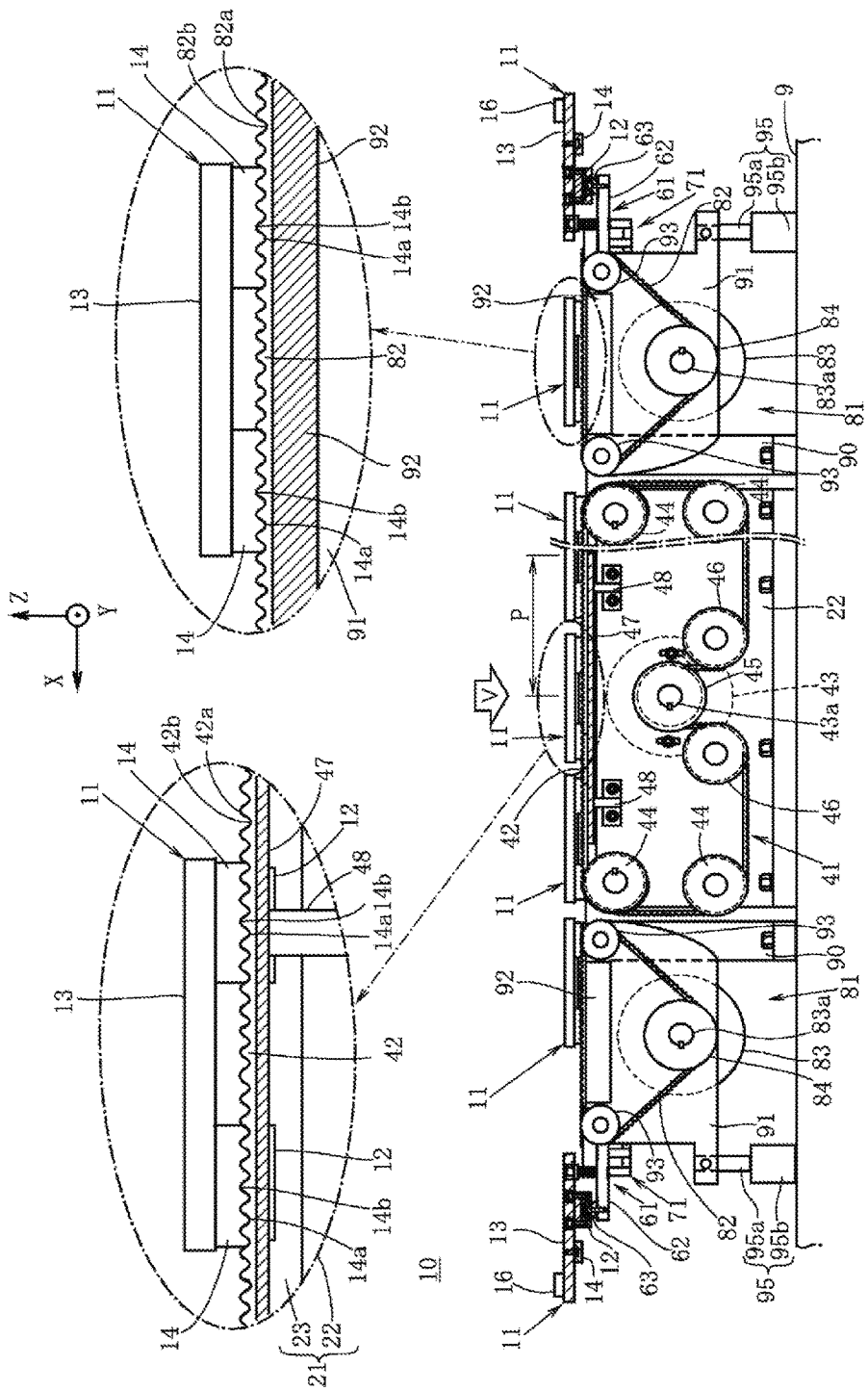
FIG. 2 is a front view of the pallet transport device shown in FIG. 1.

FIGS. 1 and 2 show a pallet transport device 10 according to the embodiment of the present invention. In each drawing, three axes X, Y, Z that are orthogonal to one another are set. The X-axis, Y-axis, and Z-axis respectively extend in a substantially horizontally sideways direction, a substantially horizontally front-back direction, and a vertical direction. A description is now given of a configuration of the pallet transport device 10 using the three axes X, Y, Z.

Figure 4:
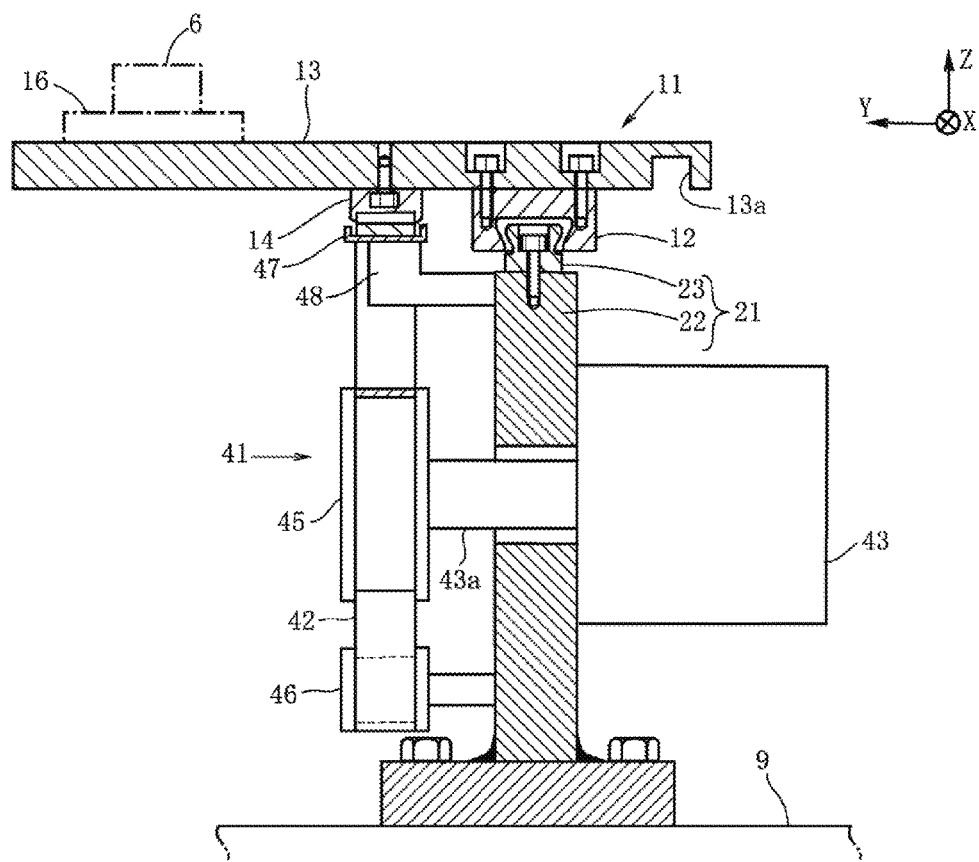
FIG. 4 is a cross-sectional view taken along the line IV-IV in FIG. 1.
Figure 5:
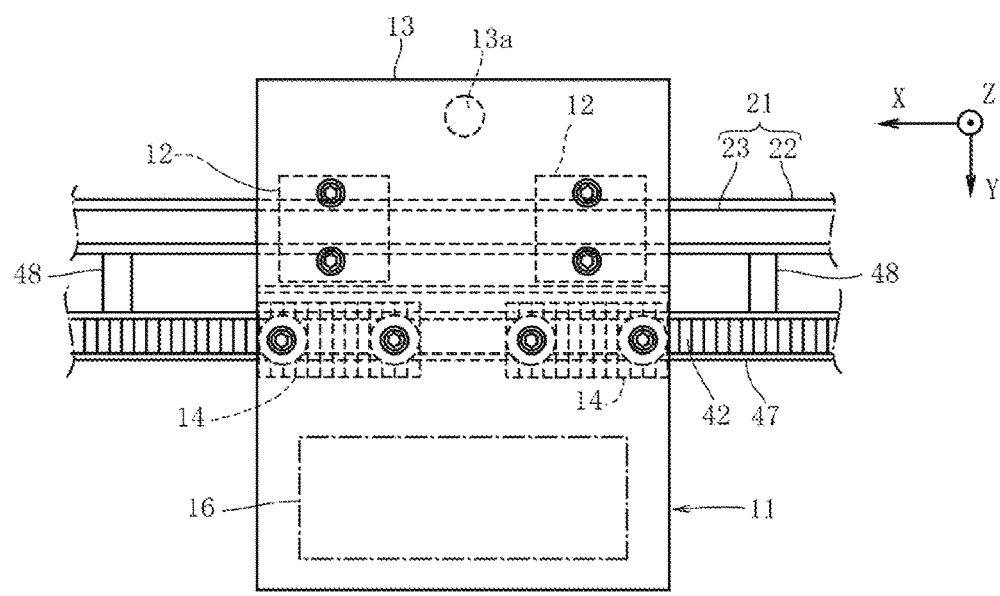
FIG. 5 is a plan view of a pallet used in the pallet transport device as viewed from the direction V shown in FIG. 2.

The pallet transport device 10 is a transport device that circulates pallets 11, and transports the pallets 11 having workpieces 6 (FIG. 4) placed thereon by circulating the pallets 11 on a track shaped path. The pallet transport device 10 also stops the pallets 11 in front of machine tools 1 to 4 (FIG. 1) that are provided along a transport path of the pallets 11. The workpieces 6 placed on the pallets 11 are processed by these machine tools 1 to 4. In this way, the pallet transport device 10 is used in processing of the workpieces 6 by the machine tools 1 to 4.

In FIG. 1, four machine tools 1 to 4 are provided on the opposite sides of the pallet transport device 10. This is one example, and the number of the machine tools varies depending on the workpieces 6 that need to be processed. The number of the pallets 11 is increased or reduced as appropriate in accordance with the number of the machine tools.

The pallet transport device 10 according to the present embodiment includes a first pallet rail 21 and a second pallet rail 31 as a plurality of pallet rails on which the pallets are movably placed. The first and second pallet rails 21, 31 are arranged in parallel to each other at a predetermined interval in a horizontal direction (a Y-axis direction).

The pallets 11 are movably placed on the first and second pallet rails 21, 31. Each of the first and second pallet rails 21, 31 is provided on a rack 9 and extends straight in an X-axis direction. The pallets 11 are moved and transported along the first and second pallet rails 21, 31 in a circulatory manner.

As the first and second pallet rails 21, 31 are structured in the same manner, the first pallet rail 21 will be described below as a representative. The pallets 11 are placed in a horizontal state on the first pallet rail 21. As illustrated in detail in FIG. 4, the first pallet rail 21 includes a support plate 22 that is fixedly mounted directly on the rack 9, and a commercially-available linear-motion guide rail 23 that is fixedly screwed to an upper edge of the support plate 22.

Each pallet 11 includes linear-motion blocks 12 that are movably supported on the first and second pallet rails 21, 31, a base 13 screwed to the linear-motion blocks 12, and locking members 14 mounted on the base 13. The linear-motion blocks 12 are formed so as to overpass the linear-motion guide rail 23.

The linear-motion blocks 12 are sold in a pair with the linear-motion guide rail 23. Preferably, the linear-motion blocks 12 include a non-illustrated roller retainer. By using the linear-motion blocks 12 including the roller retainer, resistance that is generated when the pallet 11 moves on the first and second pallet rails 21, 31 can be substantially reduced while restricting a movement in a width direction (the Y-axis direction) and tilting with respect to the first and second pallet rails 21, 31.

A placing tool 16 for placing a workpiece 6 is mounted on an upper surface of the base 13. The placing tool 16 is positioned on one side portion of the base 13. The workpiece 6 is fixed to the base 13 via the placing tool 16. The structure of the placing tool 16 is changed as appropriate in accordance with the type of the workpiece 6 that is processed while being placed on the pallet 11. The linear-motion blocks 12 are fixed to the other side portion of the base 13. The locking members 14 are arranged between the linear-motion blocks 12 and the placing tool 16 on the base 13.

As described above, the linear-motion blocks 12 are movably supported so as to overpass the linear-motion guide rails 23 of the first and second pallet rails 21, 31. Therefore, even in a state where one side portion of the base 13 is supported by the first and second pallet rails 21, 31 via the linear-motion blocks 12, the pallets 11 are movably placed in a horizontal state on the first and second pallet rails 21, 31.

As shown in FIG. 1, the machine tools 1, 2 are installed at a predetermined pitch P, and the machine tools 3, 4 are installed at the predetermined pitch P. It is preferable that the bases 13 of the pallets 11 be formed in such a manner that a length L thereof in the X-axis direction is the same as the pitch P or smaller than the pitch P.

In this case, when the plurality of pallets 11 move at the predetermined pitch P on the first and second pallet rails 21, 31, the plurality of pallets 11 face the machine tools 1 to 4 in such a manner that one side portion of each base 13 in a horizontal state projects toward the machine tool 1, 2, 3, or 4. Therefore, a workpiece 6 that is placed on one side portion via a placing tool 16 can be processed by the machine tool 1, 2, 3, or 4.

It should be noted that a locking hole 13a, into which an elevator rod 72 (FIGS. 6 to 8) of a later-described pallet locking mechanism 71 is inserted, is formed in the other side portion of each base 13. A diameter of the locking hole 13a is slightly larger than an outer diameter of an upper end of the elevator rod 72 so that the upper end of the elevator rod 72 is insertable into the locking hole 13a. The details of the locking members 14 will be described later.

As shown in FIGS. 1 and 2, the pallet transport device 10 according to the present embodiment includes a first pallet feeding unit 41 that transports pallets 11 placed on the first pallet rail 21, and a second pallet feeding unit 51 that transports pallets 11 placed on the second pallet rail 31. The first pallet feeding unit 41 propels the pallets 11 along the first pallet rail 21. The second pallet feeding unit 51 propels the pallets 11 along the second pallet rail 31.

As the first pallet feeding unit 41 and the second pallet feeding unit 51 are structured in the same manner, the first pallet feeding unit 41 will be described below as a representative.

The first pallet feeding unit 41 includes a circulation belt 42 that is arranged endlessly along the first pallet rail 21, and a servomotor 43 (FIG. 2) serving as a circulation mechanism that circulates the circulation belt 42. The circulation belt 42 is formed so as to be engageable with the pallets 11.

As shown in FIG. 2, follower pulleys 44 are disposed at four corners of the support plate 22 of the first pallet rail 21. The circulation belt 42 is hung around these four follower pulleys 44 so as to surround the follower pulleys 44.

The servomotor 43 is mounted on the support plate 22. A driving pulley 45 is attached to a rotation shaft 43a of the servomotor 43. The driving pulley 45 and the four follower pulleys 44 are disposed on the same plane. The first pallet feeding unit 41 includes a pair of turning pulleys 46 by which the circulation belt 42 is turned so as to be wound around the driving pulley 45. The pair of turning pulleys 46 is disposed in the vicinity of the driving pulley 45 and rotatably supported by the support plate 22.

When the servomotor 43 is actuated by an instruction from a non-illustrated controller, the rotation shaft 43a rotates together with the driving pulley 45. Along with the rotation of the driving pulley 45, the circulation belt 42 is circulated while surrounding the four follower pulleys 44.

The circulation belt 42 is a so-called toothed belt. As shown in an enlarged view of FIG. 2, the circulation belt 42 is a belt on which recesses and projections 42a, 42b are formed in an alternating manner in a longitudinal direction. The recesses and projections 42a, 42b extend in a width direction of the circulation belt 42. The recesses and projections 42a, 42b are formed so as to be engageable with recesses and projections 14a, 14b of the pallets 11. The recesses and projections 14a, 14b are formed on the locking members 14 of the pallets 11.

Similarly to the linear-motion blocks 12, the locking members 14 are provided below the bases 13. In a state where the pallets 11 overlie the circulation belt 42, the locking members 14 engage with the circulation belt 42. Specifically, when the locking members 14 overlie the circulation belt 42, the recesses and projections 14a, 14b of the locking members 14 engage with the recesses and projections 42a, 42b of the circulation belt 42. When the locking members 14 are lifted and separated from the circulation belt 42, the engagement between the recesses and projections 42a, 42b of the circulation belt 42 and the recesses and projections 14a, 14b of the locking members 14 is broken.

The engagement between the recesses and projections 14a, 14b of the pallets 11 and the recesses and projections 42a, 42b of the circulation belt 42 restricts a movement of the pallets 11 in the X-axis direction relative to the circulation belt 42. Therefore, when the circulation belt 42 that is in engagement with the pallets 11 is circulated by driving the servomotor 43, the pallets 11 move together with the circulation belt 42. As the circulation belt 42 is provided along the first pallet rail 21, the pallets 11 are transported along the first pallet rail 21. Similarly, as the circulation belt 42 of the second pallet feeding unit 51 is provided along the second pallet rail 31, the pallets 11 are transported along the second pallet rail 31.

A member denoted by reference sign 47 in FIG. 2 is a support member that supports the circulation belt 42 between follower pulleys 44. The support member 47 prevents deflection of the circulation belt 42 between follower pulleys 44, and prevents separation of the circulation belt 42 from the locking members 14. Members denoted by reference sign 48 are attachment tools via which the support member 47 is attached to the support plate 22.

As shown in FIG. 1, pallet moving units 61 are disposed respectively in the vicinity of the opposite end portions of the first and second pallet rails 21, 31.

The pallet moving units 61 move the pallets 11 from one of the first and second pallet rails 21, 31 to the other.

In the present embodiment, the pallet moving units 61 move the pallets 11 from the first pallet rail 21 to the second pallet rail 31, and also move the pallets 11 from the second pallet rail 31 to the first pallet rail 21.

Furthermore, each pallet moving unit 61 includes a rotation plate 62, one or more short rails 63 mounted on the rotation plate 62, and an index unit 64 (FIGS. 6 to 8) that rotates the rotation plate 62. The rotation plate 62 is rotatable about a vertical axis on an intermediate line m (indicated by a dash-and-dot line in FIG. 1) between the first pallet rail 21 and the second pallet rail 31 that are arranged at the predetermined interval. The short rails 63 are arranged in parallel with a tangent T to a rotation circumference formed by a periphery of the rotation plate 62.

In the present embodiment, each pallet moving unit 61 includes two pairs of short rails 63. A pair of short rails 63 opposes each other on the rotation circumference of the rotation plate 62.

Figure 6:
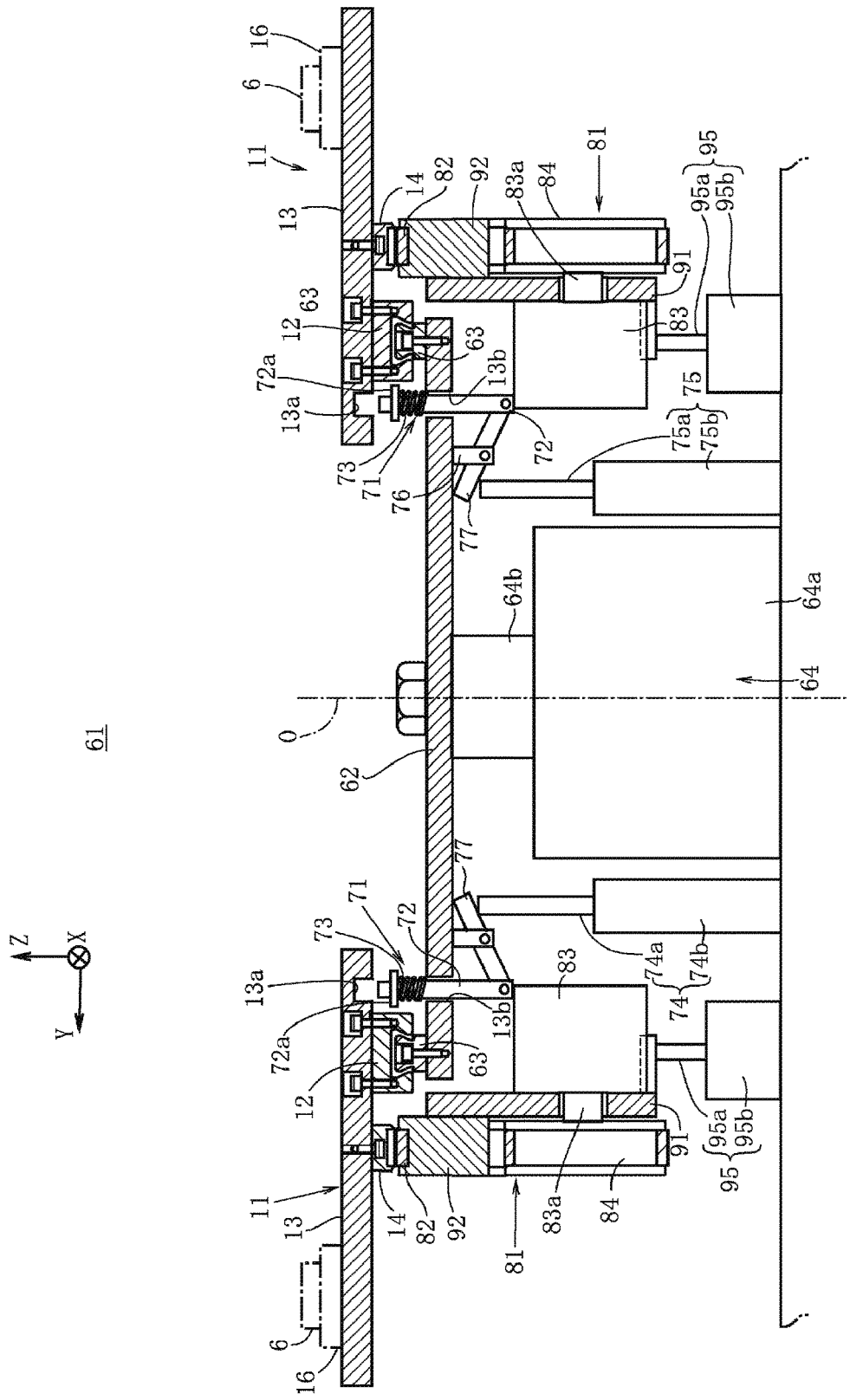
FIG. 6 is a cross-sectional view taken along the line VI-VI in FIG. 1, and shows a pallet moving unit.
Figure 7:
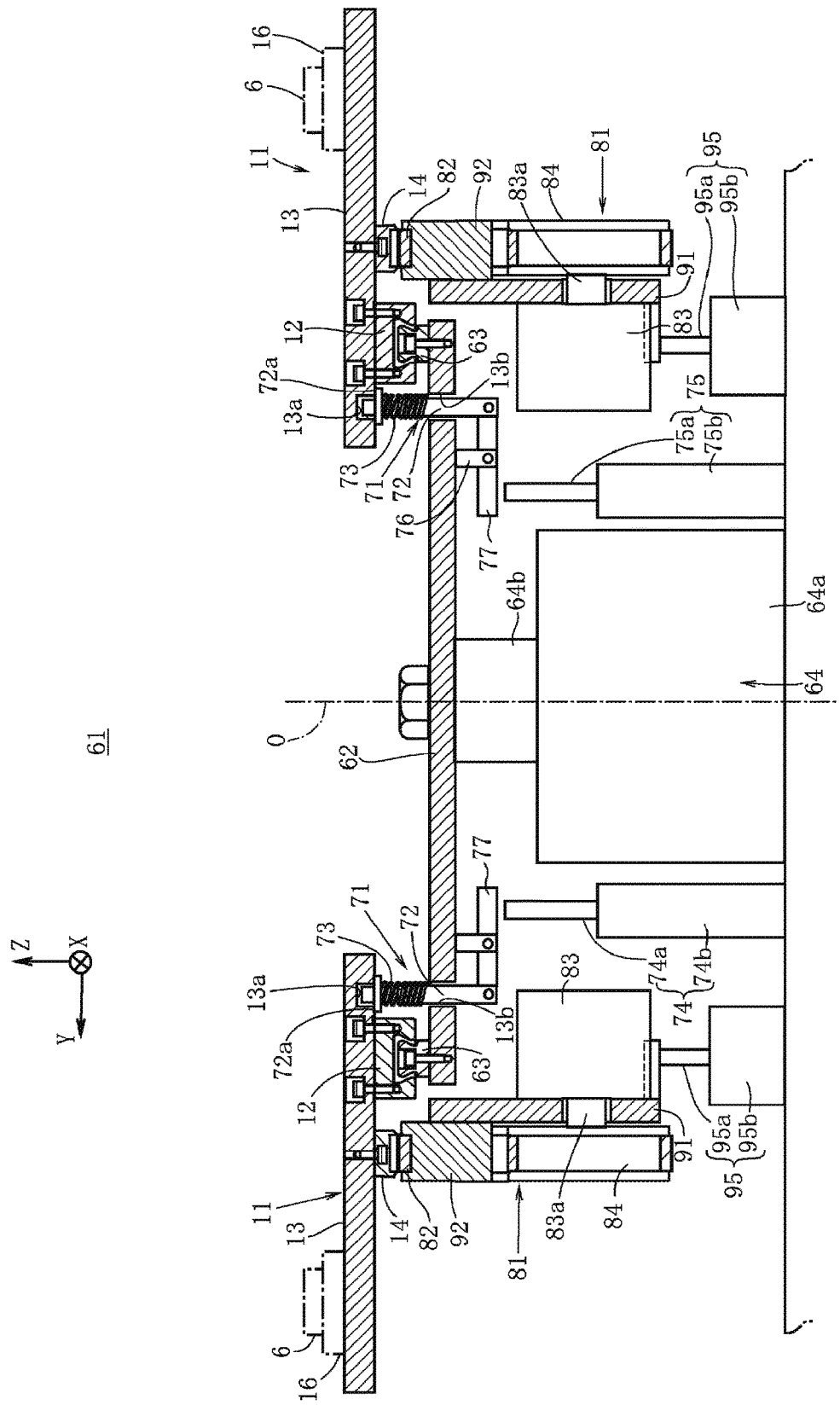
FIG. 7 shows a state where a movement of pallets relative to short rails is restricted by pallet locking mechanisms in correspondence with FIG. 6.
Figure 8:
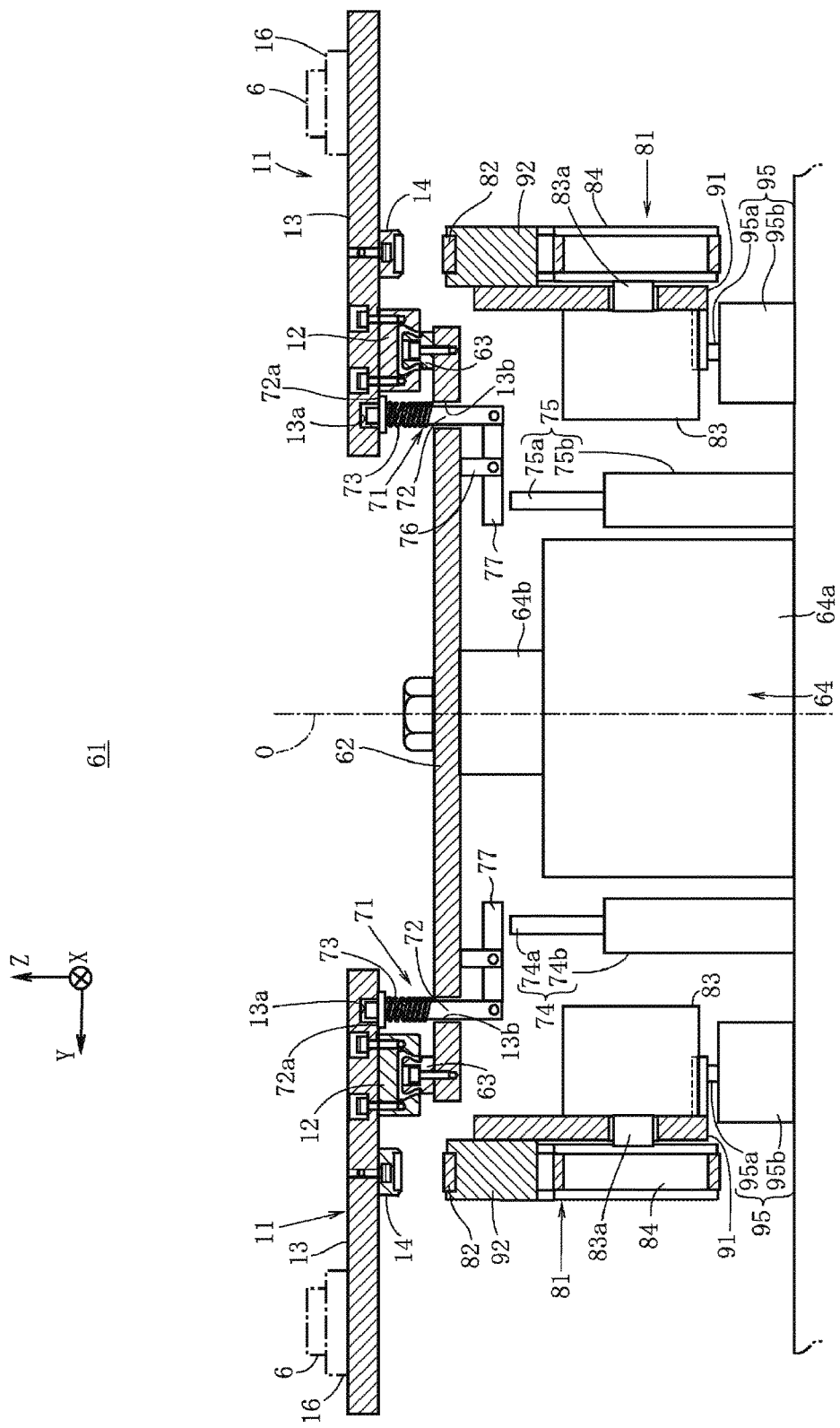
FIG. 8 shows a state where the elevator units have caused the pallet feeding assist units to descend in correspondence with FIG. 6.

As shown in FIGS. 6 to 8, the index unit 64 includes a main body portion 64a having a shape of a quadrate box, and a rotation rod 64b that projects upward from a substantially central portion of an upper surface of the main body portion 64a. The main body portion 64a is attached to the rack 9. The rotation rod 64b is mounted on the main body portion 64a so as to be rotatable about the vertical axis. A rotation center O of the rotation rod 64b is positioned on the intermediate line m (FIG. 1) between the first and second pallet rails 21, 31.

The rotation plate 62 is screwed in a horizontal state to an upper end of the rotation rod 64b. When the rotation rod 64b is rotated by an instruction from the non-illustrated controller, the rotation plate 62 rotates by a predetermined angle as indicated by solid-line arrows in FIG. 11.

As shown in FIG. 1, one or more short rails 63 are disposed at the periphery of the rotation plate 62. In the present embodiment, as mentioned earlier, two pairs of short rails 63 are used, and a pair of short rails 63 opposes each other on the rotation circumference of the rotation plate 62 in each pallet moving unit 61. That is, four short rails 63 are used in total.

In the present embodiment that uses four short rails 63, the rotation plate 62 is formed in a shape of a cross when viewed from above in such a manner that the rotation plate 62 has, at its periphery, four projection ends that project. Each of the four short rails 63 is positioned on the corresponding projection end at an equal distance from the rotation center O. In this way, the short rails 63 are disposed at four places at an angular interval of 90 degrees so as to oppose one another on the rotation circumference of the rotation plate 62.

The short rails 63 have the same cross-sectional shape as the linear-motion guide rails 23 of the first and second pallet rails 21, 31. A length W of the short rails 63 is the same as or larger than the length L of the pallets 11 in the X-axis direction.

In the present embodiment provided with four short rails 63 that compose two pairs of opposing short rails 63, two short rails 63 are in symmetric positions with respect to a point of symmetry represented by the rotation center O. The main body portion 64a of the index unit 64 is fixed to the rack 9 so as to make two short rails 63 continuous with the linear-motion guide rails 23 of the first and second pallet rails 21, 31.

Specifically, when a short rail 63 is rotated by 180 degrees about the rotation center O of the rotation plate 62 in a state where it is continuous with the linear-motion guide rail 23 of the first pallet rail 21, this short rail 63 becomes continuous with the linear-motion guide rail 23 of the second pallet rail 31.

In a state where short rails 63 are continuous with the linear-motion guide rails 23 of the first and second pallet rails 21, 31, pallets 11 can be moved from the linear-motion guide rails 23 to the short rails 63 and placed on the short rails 63, and also can be moved from the short rails 63 to the linear-motion guide rails 23 and placed on the linear-motion guide rails 23.

In a state where a short rail 63 is continuous with the first pallet rail 21, a predetermined gap d is provided between the first pallet rail 21 and the short rail 63. Similarly, in a state where a short rail 63 is continuous with the second pallet rail 31, a predetermined gap d is provided between the second pallet rail 31 and the short rail 63. With the presence of the gap d, contact between the short rails 63 and the first and second pallet rails 21, 31 is prevented when the rotation plate 62 rotates, and the rotation of the rotation plate 62 is not impaired by the first and second pallet rails 21, 31.

As shown in FIGS. 6 to 8, the rotation plate 62 includes pallet locking mechanisms 71 that are in one-to-one correspondence with the short rails 63. In a state where a pallet 11 is placed on a short rail 63 disposed at the periphery of the rotation plate 62, each pallet locking mechanism 71 restricts a relative movement of the pallet 11 relative to the short rail 63.

In the present embodiment, each pallet locking mechanism 71 includes an elevator rod 72 mounted on the rotation plate 62, a coil spring (an elastic body) 73 that pushes the elevator rod 72, and a first cylinder 74 or a second cylinder 75 that moves the elevator rod 72. The elevator rod 72 has an upper end that is formed so as to be insertable into the locking hole 13a of a pallet 11 placed on a short rail 63. The coil spring 73 pushes the elevator rod 72 in a direction in which the upper end of the elevator rod 72 is inserted into the locking hole 13a. The first and second cylinders 74, 75 move the elevator rod 72, against a pushing force of the coil spring 73, in a direction in which the upper end of the elevator rod 72 withdraws from the locking hole 13a.

Through holes 13b are formed in the rotation plate 62. The elevator rods 72 are provided in such a manner that they are movable in the vertical direction while penetrating through the through holes 13b. Each elevator rod 72 is provided with a flange 72a. The flange 72a comes into contact, from below, with a lower surface of the base 13 around the locking hole 13a in a state where the upper end of the elevator rod 72 has been inserted into the locking hole 13a (FIGS. 7 and 8).

The coil spring 73, which is the elastic body, is mounted in a compressed state between the flange 72a and the rotation plate 62. A restoring force of the coil spring 73 pushes the elevator rod 72 upward.

Support pillars 76 that project downward are mounted on a lower surface of the rotation plate 62. A substantial center of a swing piece 77 is rotatably supported by a lower end of each support pillar 76. The swing piece 77 is rotatably supported while extending in a radial direction of the rotation plate 62. An outer end portion of the swing piece 77 is rotatably supported by a lower end of the elevator rod 72.

The first cylinder 74 is attached to the rack 9 in such a manner that, when a short rail 63 is continuous with the first pallet rail 21, an upper end of a projectable/retractable rod 74a opposes an inner end portion of the swing piece 77. The second cylinder 75 is attached to the rack 9 in such a manner that, when a short rail 63 is continuous with the second pallet rail 31, an upper end of a projectable/retractable rod 75a opposes an inner end portion of the swing piece 77.

As shown in FIG. 6, when the first and second cylinders 74, 75 cause the projectable/retractable rods 74a, 75a to project in a state where the projectable/retractable rods 74a, 75a oppose the inner end portions of the swing pieces 77, the swing pieces 77 swing. As the lower ends of the elevator rods 72 are rotatably supported by the outer end portions of the swing pieces 77, the elevator rods 72 move downward against the pushing forces of the coil springs 73, which are the elastic bodies. The upper ends of the elevator rods 72 withdraw from the locking holes 13a provided in pallets 11, thereby enabling a free movement of the pallets 11 placed on short rails 63.

As shown in FIG. 7, when the first and second cylinders 74, 75 cause the projectable/retractable rods 74a, 75a to be retracted into main bodies 74b, 75b, the elevator rods 72 move upward with the aid of the pushing forces of the coil springs 73. The upper ends of the elevator rods 72 are inserted into the locking holes 13a provided in the pallets 11. This restricts a free movement of the pallets 11 placed on the short rails 63.

In placing a pallet 11 on a short rail 63, as shown in FIG. 6, the pallet moving unit 61 causes the projectable/retractable rod 74a of the first cylinder 74 to project, thereby causing the elevator rod 72 to move downward against the pushing force of the coil spring 73. In this state, as the elevator rod 72 does not impair a movement of the pallet 11, the pallet 11 is moved from the first pallet rail 21 to the short rail 63 that is continuous with the first pallet rail 21, and is placed on the short rail 63.

Thereafter, as shown in FIG. 7, the pallet moving unit 61 causes the projectable/retractable rod 74a of the first cylinder 74 to be retracted, thereby moving the elevator rod 72 upward with the aid of the pushing force of the coil spring 73. In this state, the upper end of the elevator rod 72 is inserted into the locking hole 13a provided in the pallet 11. This can restrict a relative movement of the pallet 11 relative to the short rail 63.

After causing a later-described pallet feeding assist unit 81 to descend in this state, the pallet moving unit 61 rotates the rotation plate 62 together with the pallet 11. As a result, the short rail 63 on which the pallet 11 is placed can be separated from a first position that is continuous with the first pallet rail 21, and rotated to a second position that is continuous with the second pallet rail 31.

Figure 11:
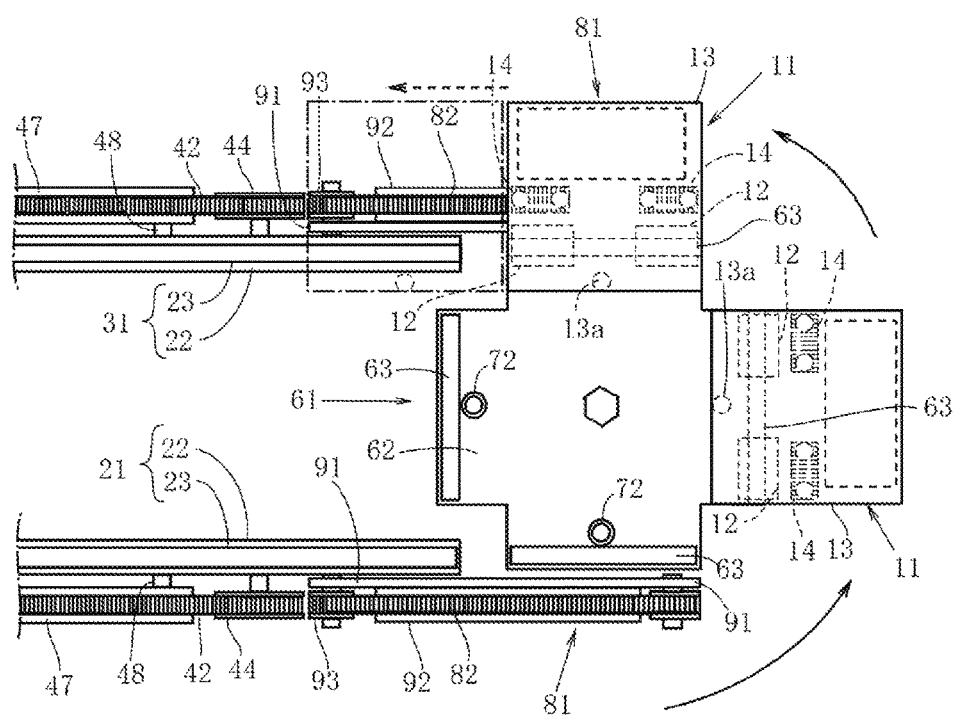
FIG. 11 shows a state where a rotation plate has been rotated together with a pallet placed on a short rail in correspondence with FIG. 9.

In a state where the short rail 63 on which the pallet 11 is placed has been rotated to the second position, this short rail 63 is continuous with the second pallet rail 31 as shown in FIG. 11.

Thereafter, as shown in FIG. 6, the pallet moving unit 61 causes the projectable/retractable rod 75a of the second cylinder 75 to project, thereby moving the elevator rod 72 downward again against the pushing force of the coil spring 73. This permits a movement of the pallet 11 placed on the short rail 63, and enables to move the pallet 11 to the second pallet rail 31.

As shown in FIGS. 1 and 2, the pallet transport device 10 includes pallet feeding assist units 81. The pallet feeding assist units 81 move pallets 11 from the first pallet rail 21 to a short rail 63 that is continuous with the first pallet rail 21, or move pallets 11 from a short rail 63 to the first pallet rail 21 that is continuous with the short rail 63. The pallet feeding assist units 81 also move pallets 11 from the second pallet rail 31 to a short rail 63 that is continuous with the second pallet rail 31, or move pallets 11 from a short rail 63 to the second pallet rail 31 that is continuous with the short rail 63.

The pallet feeding assist units 81 are disposed in the vicinity of the opposite end portions of the first and second pallet rails 21, 31. As these pallet feeding assist units 81 are structured in the same manner, one of them will be described below as a representative.

The pallet feeding assist unit 81 according to the present embodiment includes an auxiliary circulation belt 82 that is provided so as to be continuous with a circulation belt 42, and a servomotor (an auxiliary circulation mechanism) 83 (FIG. 2) that circulates the auxiliary circulation belt 82. The auxiliary circulation belt 82 is circulated along the end portions of the first and second pallet rails 21, 31 and short rails 63 that are continuous with the end portions of the first and second pallet rails 21, 31.

Similarly to the circulation belt 42, the auxiliary circulation belt 82 is a so-called toothed belt. The auxiliary circulation belt 82 also has recesses and projections 82a, 82b that extend in a width direction. The recesses and projections 82a, 82b are formed continuously in an alternating manner in a longitudinal direction (an enlarged view of FIG. 2). The recesses and projections 14a, 14b of the locking members 14 of the pallets 11 are formed so as to be engageable with the recesses and projections 82a, 82b as well.

In the present embodiment, the pallet feeding assist unit 81 has a supporting point that is located at end portion thereof near the first pallet feeding unit 41 or the second pallet feeding unit 51, and the other end that ascends and descends by rotating about the supporting point. The pallet feeding assist unit 81 is not limited to this mode, and may ascend and descend horizontally.

As shown in FIGS. 2 and 6, rotational support pillars 90 stand on the rack 9, and auxiliary plates 91 are rotatably supported by the rotational support pillars 90. The rotational support pillars 90 are disposed in the vicinity of the opposite end portions of the support plates 22 of the first and second pallet rails 21, 31. The auxiliary plates 91 are continuous with the support plates 22 in such a manner that one end of each auxiliary plate 91 is positioned near the first pallet feeding unit 41 or the second pallet feeding unit 51, and this one end is rotatably supported by the rotational support pillar 90.

Guide members 92 are horizontally mounted on the upper ends of the auxiliary plates 91. The guide members 92 extend in the X-axis direction along the end portions of the first and second pallet rails 21, 31 and short rails 63 that are continuous with the first and second pallet rails 21, 31.

The guide members 92 support the auxiliary circulation belts 82 from below so that the auxiliary circulation belts 82 run along the end portions of the first and second pallet rails 21, 31 and short rails 63 that are continuous with the first and second pallet rails 21, 31.

Auxiliary pulleys 93, which turn the auxiliary circulation belts 82 that move in the X-axis direction while lying on the upper surfaces of the guide members 92, are rotatably supported by the auxiliary plates 91. The auxiliary pulleys 93 are disposed at the opposite sides of the guide members 92.

The servomotors 83, which are the auxiliary circulation mechanisms, are mounted on the auxiliary plates 91. The servomotors 83 circulate the auxiliary circulation belts 82. Auxiliary driving pulleys 84 are attached to rotation shafts 83a of the servomotors 83.

Each auxiliary driving pulley 84 is disposed on the same plane as two auxiliary pulleys 93. Each auxiliary circulation belt 82 is hung around the auxiliary driving pulley 84 and auxiliary pulleys 93 (FIG. 2).

When the servomotors 83 are actuated by an instruction from the non-illustrated controller, the auxiliary circulation belts 82, which are hung around the auxiliary driving pulleys 84, are circulated. Each auxiliary circulation belt 82 moves on an upper surface of the horizontal guide member 92 between two auxiliary pulleys 93. That is, the auxiliary circulation belts 82 move along the end portions of the first and second pallet rails 21, 31 and short rails 63 that are continuous with the first and second pallet rails 21, 31.

Similarly to the circulation belts 42, the auxiliary circulation belts 82 have the recesses and projections 82a, 82b that extend in the width direction and are formed continuously in an alternating manner in the longitudinal direction. Therefore, when the locking members 14 overlie the auxiliary circulation belts 82, the recesses and projections 82a, 82b of the auxiliary circulation belts 82 engage with the recesses and projections 14a, 14b of the locking members 14.

Figure 9:
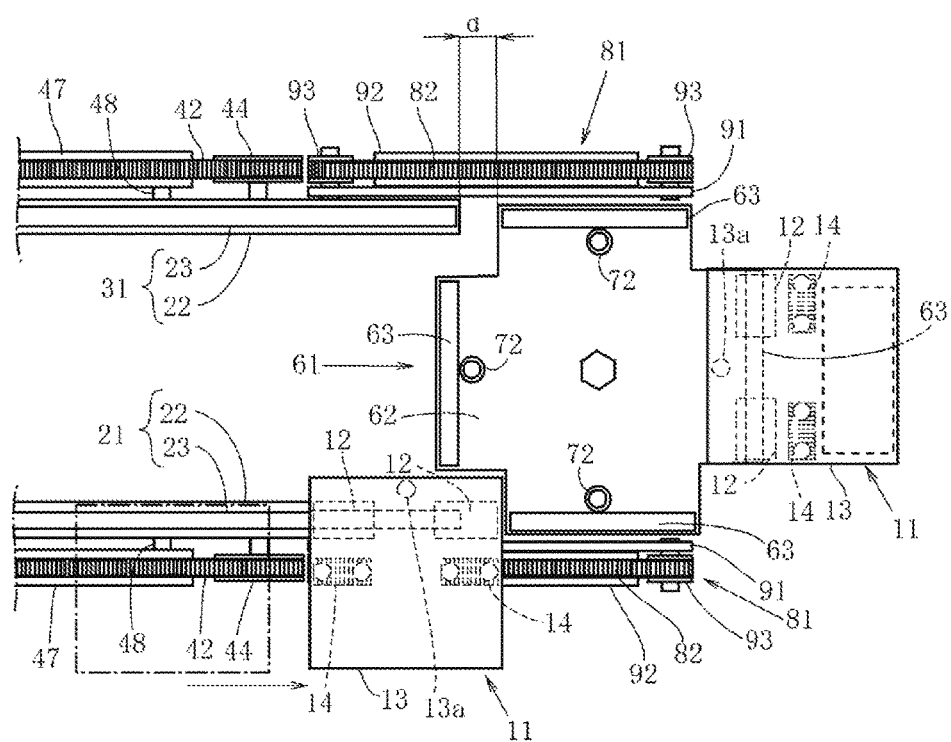
FIG. 9 is a top view showing a state where a pallet has been transported and reached an end portion of a first pallet rail.

Therefore, when the auxiliary circulation belt 82 is circulated at the same speed as the circulation belt 42 that is in engagement with a pallet 11, the pallet 11 moves on the first pallet rail 21, and also moves from the circulation belt 42 to the auxiliary circulation belt 82 at the end portion of the first pallet rail 21 and engages with the auxiliary circulation belt 82 as indicated by a solid-line arrow in FIG. 9.

As shown in FIG. 2, when the recesses and projections 14a, 14b of pallets 11 are in engagement with the recesses and projections 82a, 82b of the auxiliary circulation belts 82, a relative movement of the pallets 11 in the X-axis direction relative to the auxiliary circulation belts 82 is restricted. Therefore, when the auxiliary circulation belts 82 are circulated while in engagement with the pallets 11, the pallets 11 move together with the auxiliary circulation belts 82 and are transported either along short rails 63 running along the auxiliary circulation belts 82 or along the first and second pallet rails 21, 31.

Figure 10:
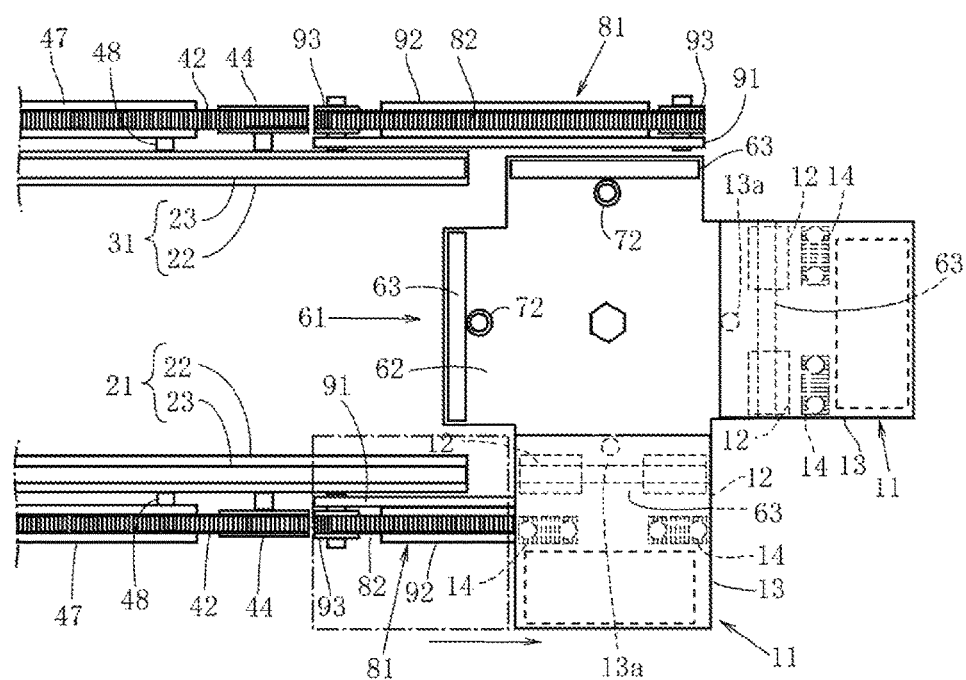
FIG. 10 is a top view showing a state where a pallet has been placed on a short rail from the end portion of the first pallet rail in correspondence with FIG. 9.

As shown in FIG. 10, when the auxiliary circulation belt 82 is further circulated while in engagement with the locking members 14, a pallet 11 moves from the end portion of the first pallet rail 21 to a short rail 63 that is continuous with the first pallet rail 21. When the auxiliary circulation belt 82 is circulated in reverse, the pallet 11 moves from the short rail 63 to the first pallet rail 21 or the second pallet rail 31.

Figure 3:
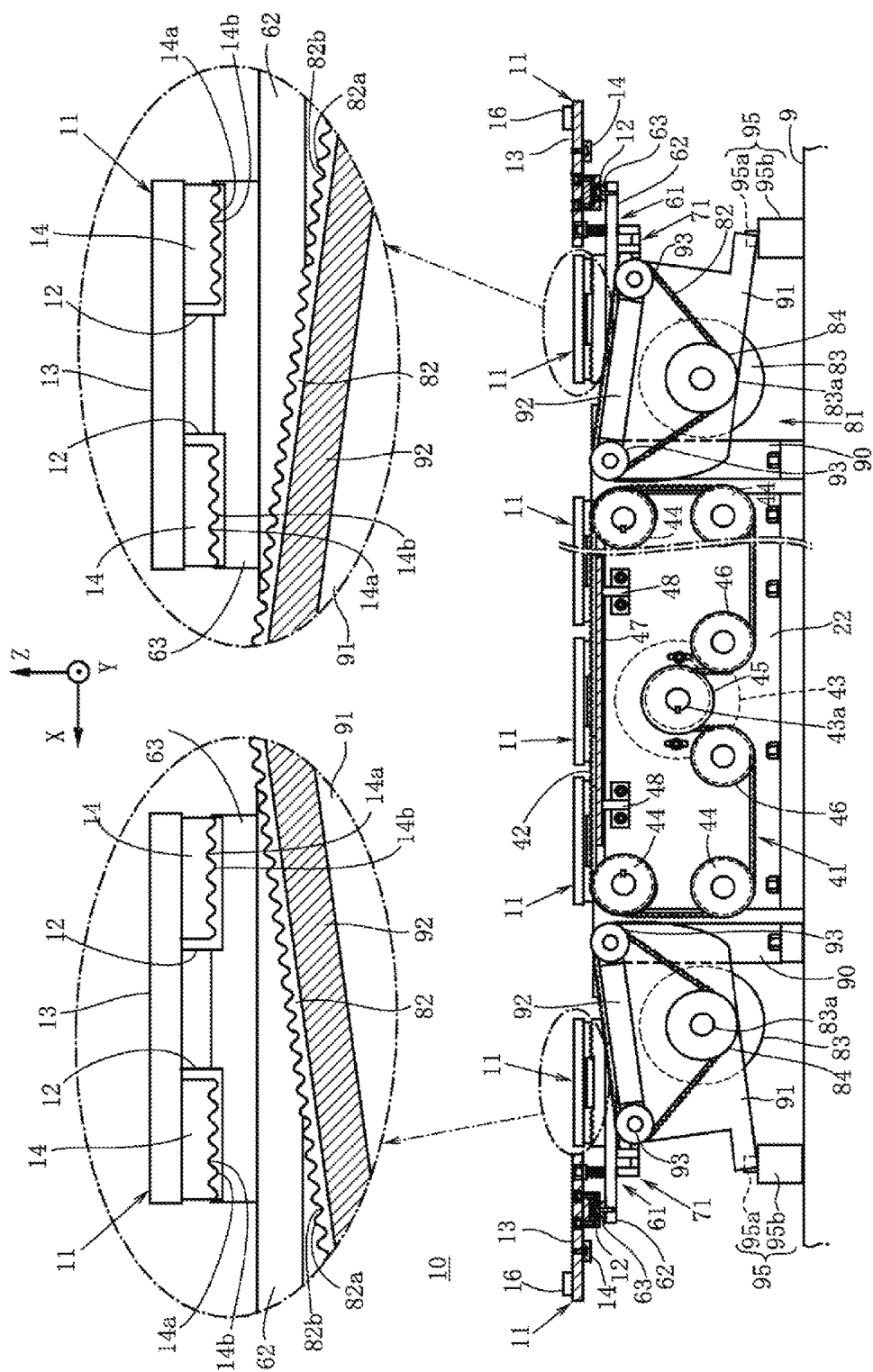
FIG. 3 is a front view of the pallet transport device, and shows a state where elevator units have caused pallet feeding assist units to descend.

As shown in FIGS. 2 and 3, the pallet transport device 10 further includes fluid pressure cylinders (elevator units) 95 that cause the pallet feeding assist units 81 to ascend and descend. Main bodies 95b of the fluid pressure cylinders 95 are fixed to the rack 9 with projectable/retractable rods 95a facing upward. The other ends of the auxiliary plates 91 are rotatably supported by the upper ends of the projectable/retractable rods 95a.

The fluid pressure cylinders 95 are configured in such a manner that, in a state where the projectable/retractable rods 95a project upward, the auxiliary circulation belts 82 on the auxiliary plates 91 overlie the locking members 14 of pallets 11 placed on short rails 63.

As shown in FIG. 3, the locking members 14 are mounted on the lower surfaces of the bases 13 of the pallets 11. As the other ends of the auxiliary plates 91 are rotatably supported by the other ends of the projectable/retractable rods 95a, the pallet feeding assist units 81 including the auxiliary plates 91 descend as a result of causing the projectable/retractable rods 95a of the fluid pressure cylinders 95 to be retracted into the main bodies 95b. Consequently, the auxiliary circulation belts 82 on the auxiliary plates 91 descend as well.

Free rotation of the rotation plates 62 is restricted in a state where the pallet locking mechanisms 71 are restricting a free movement of pallets 11 placed on short rails 63 and the recesses and projections 14a, 14b of the locking members 14 of pallets 11 are in engagement with the recesses and projections 82a, 82b of the auxiliary circulation belts 82.

FIGS. 3 and 8 show a state where a pallet 11 has moved to a short rail 63 while the locking members 14 are overlying the auxiliary circulation belt 82. In this state, if the pallet feeding assist unit 81 descends along with the descent of the other end of the auxiliary plate 91, the recesses and projections 82a, 82b of the auxiliary circulation belt 82 become separated from the recesses and projections 14a, 14b of the locking members 14.

As a result, the engagement between the recesses and projections 82a, 82b of the auxiliary circulation belt 82 and the recesses and projections 14a, 14b of the locking members 14 is broken. This permits horizontal rotation of the rotation plate 62 of the pallet moving unit 61 that includes the short rail 63 on which the pallet 11 is placed.

As shown in FIGS. 2, 6, and 7, when short rails 63 disposed at the peripheries of the rotation plates 62 are continuous with the first and second pallet rails 21, 31, the fluid pressure cylinders 95 cause the projectable/retractable rods 95a to project upward again. This causes the other ends of the auxiliary plates 91, which have descended, to ascend. Thus, the locking members 14 of pallets 11 overlie the auxiliary circulation belts 82. As a result, the recesses and projections 82a, 82b of the auxiliary circulation belts 82 engage with the recesses and projections 14a, 14b of the locking members 14 again.

A description is now given of a pallet transport method that uses the foregoing pallet transport device.

The pallet transport method that uses the pallet transport device 10 can circulate pallets 11. The pallet transport method includes: a first pallet transport step of transporting the pallets 11 along the first pallet rail 21; a first pallet moving step of moving the pallets 11 from the end portion of the first pallet rail 21 to the second pallet rail 31; a second pallet transport step of transporting the pallets 11 along the second pallet rail 31; and a second pallet moving step of moving the pallets 11 from the end portion of the second pallet rail 31 to the first pallet rail 21. In the first pallet transport step, the pallets 11 are placed on the first pallet rail 21. In the second pallet transport step, the pallets 11 are placed on the second pallet rail 31.

The following describes each step according to the present embodiment in a case where the pallets 11 are circulated on a counterclockwise path when viewed from above as in FIG. 1.

<First Pallet Transport Step>

In this step, a pallet 11 placed on the first pallet rail 21 is transported.

In the present embodiment, a workpiece 6 that requires predetermined processing is placed on the pallet 11. The following description pertains to an example in which the workpiece 6 is placed on the pallet 11 that is placed on the first pallet rail 21. Furthermore, the following description pertains to an example in which the pallet 11 includes the placing tool 16 for placing the workpiece 6, and the workpiece 6 is placed on the pallet 11 via the placing tool 16.

To place the pallet 11 on the first pallet rail 21, an end portion of the linear-motion guide rail 23 of the first pallet rail 21 is inserted into the linear-motion blocks 12 of the pallet 11, and the linear-motion blocks 12 are placed on the linear-motion guide rail 23.

Once the pallet 11 has been placed on the first pallet rail 21, the recesses and projections 14a, 14b of the pallet 11 engage with the recesses and projections 42a, 42b of the circulation belt 42 provided along the first pallet rail 21. The pallet 11 can be transported along the first pallet rail 21 by circulating the circulation belt 42 through driving of the servomotor 43, which is a driving mechanism.

The pallet 11 is transported until it faces the machine tool 1 or 2 provided along the first pallet rail 21. Once the pallet 11 has faced the machine tool 1 or 2, the servomotor 43 is stopped. The workpiece 6 placed on the pallet 11 is processed by the machine tool 1 or 2. At this time, by transporting a plurality of pallets 11 at a pitch that is equal to the pitch P between the plurality of machine tools 1, 2, processing by a plurality of machine tools 1, 2 can be executed simultaneously.

<First Pallet Moving Step>

In this step, the pallet 11 is moved from the end portion of the first pallet rail 21 to the second pallet rail 31. This movement is carried out by the pallet moving unit 61 that is disposed in the vicinity of one of the end portions of the first and second pallet rails 21, 31.

In the present embodiment, the auxiliary circulation belts 82 are provided continuously with the circulation belts 42. Immediately before the pallet 11 reaches the end portion of the first pallet rail 21 after moving along the first pallet rail 21 in the aforementioned first pallet transport step, the pallet 11 moves from the circulation belt 42 to the auxiliary circulation belt 82 that is continuous with the circulation belt 42 as indicated by the solid-line arrow in FIG. 9. As a result, the pallet 11 engages with the auxiliary circulation belt 82. Circulating the auxiliary circulation belt 82 at the same speed as the circulation belt 42 causes the pallet 11 to reach the end portion of the first pallet rail 21.

Here, in the present embodiment, the auxiliary circulation belt 82, which is circulated along the end portion of the first pallet rail 21 and a short rail 63 that is continuous with the end portion of the first pallet rail 21, is provided continuously with the circulation belt 42. Therefore, by stopping the circulation of the auxiliary circulation belt 82, the pallet 11 that is in engagement with the auxiliary circulation belt 82 can be kept in place at the end portion of the first pallet rail 21 regardless of the circulation of the circulation belt 42. Furthermore, by circulating the circulation belt 42, a pallet 11 that is different from the pallet 11 that is kept in place at the end portion of the first pallet rail 21 can be moved along the first pallet rail 21 regardless of the circulation of the auxiliary circulation belt 82. Specifically, by providing the auxiliary circulation belt 82 continuously with the circulation belt 42, the pallet 11 that is different from the pallet 11 that moves in the first pallet moving step can be moved along the first pallet rail 21.

In the first pallet moving step, a short rail 63 is made continuous with the first pallet rail 21 by rotating the rotation plate 62 with use of the index unit 64 of the pallet moving unit 61 (FIG. 6). In this state, the auxiliary circulation belt 82 is circulated to move the pallet 11 from the end portion of the first pallet rail 21 to the short rail 63. As a result, the pallet 11 is placed on the short rail 63 as shown in FIG. 10.

At this time, as shown in FIG. 6, the projectable/retractable rod 74a of the first cylinder 74 is caused to project from the main body 74b. The elevator rod 72 that opposes the short rail 63 continuous with the first pallet rail 21 moves downward against the pushing force of the coil spring 73. In this state, the pallet 11 is moved from the first pallet rail 21 to the short rail 63 continuous with the first pallet rail 21, and the pallet 11 is placed on the short rail 63.

Thereafter, as shown in FIG. 7, the projectable/retractable rod 74a of the first cylinder 74 is retracted into the main body 74b. The elevator rod 72 moves upward with the aid of the pushing force of the coil spring 73, and the upper end of the elevator rod 72 is inserted into the locking hole 13a provided in the pallet 11. This can prevent a relative movement of the pallet 11 relative to the short rail 63 when the pallet 11 is moved by rotating the rotation plate 62.

Then, in this state, the projectable/retractable rod 95a of the fluid pressure cylinder 95 is retracted into the main body 95b as shown in FIG. 3. As the other end of the auxiliary plate 91 is rotatably supported by the upper end of the projectable/retractable rod 95a, the auxiliary plate 91 descends. As a result, the engagement between the pallet 11 and the auxiliary circulation belt 82 is broken.

Thereafter, the index unit 64 rotates the rotation plate 62 as shown in FIG. 11. The short rail 63 having the pallet 11 placed thereon is moved from the first position that is continuous with the first pallet rail 21, and rotated to the second position that is continuous with the second pallet rail 31.

In the present embodiment in which short rails 63 are disposed on the rotation plate 62 at an angular interval of 90 degrees, rotating the rotation plate 62 by 90 degrees makes the next short rail 63 continuous with the first pallet rail 21. Therefore, upon 90-degree rotation of the rotation plate 62, the short rail 63 that was continuous with the first pallet rail 21 is merely distanced from the first position, and a pallet 11 placed on a preceding short rail 63 is moved to the second position that is continuous with the second pallet rail 31.

By providing a plurality of pairs of short rails 63 that oppose each other on the rotation circumference of the rotation plate 62, the rotation angle of the rotation plate 62 necessary in the pallet moving step is reduced. Therefore, pallets 11 can be quickly moved.

After the short rail 63 having the pallet 11 placed thereon has been made continuous with the linear-motion guide rail 23 of the second pallet rail 31, the projectable/retractable rod 95a of the fluid pressure cylinder 95 is caused to project upward, thereby causing the other end of the auxiliary plate 91, which has descended, to ascend as shown in FIG. 2. Accordingly, the locking members 14 of the pallet 11 overlie the auxiliary circulation belt 82, and the recesses and projections 82a, 82b of the auxiliary circulation belt 82 engage again with the recesses and projections 14a, 14b of the locking members 14.

During the ascent of the other end of the auxiliary plate 91, the rotation angle of the servomotor 83 is controlled by a program that has been set in advance so as to reliably achieve engagement between the recesses and projections 14a, 14b of the locking members 14 of the pallet 11 and the recesses and projections 82a, 82b of the auxiliary circulation belt 82.

After the short rail 63 having the pallet 11 placed thereon is made continuous with the second pallet rail 31 by being rotated to the second position, the projectable/retractable rod 75a of the second cylinder 75 is caused to project from the main body 75b as shown in FIG. 6. The elevator rod 72 moves downward against the pushing force of the coil spring 73, and the upper end of the elevator rod 72 withdraws from the locking hole 13a. As a result, a relative movement of the pallet 11 relative to the short rail 63 is permitted.

Thereafter, as indicated by a dash-line arrow in FIG. 11, the auxiliary circulation belt 82 that is positioned in the vicinity of the end portion of the second pallet rail 31 and is in engagement with the pallet 11 is circulated, thereby moving the pallet 11 together with the auxiliary circulation belt 82. The pallet 11 is moved from the short rail 63 to the second pallet rail 31.

In the foregoing manner, the pallet 11 is moved from the end portion of the first pallet rail 21 to the second pallet rail 31.

<Second Pallet Transport Step>

In this step, the pallet 11 placed on the second pallet rail 31 is transported. In the aforementioned first pallet moving step, the pallet 11 is moved from the short rail 63 to the second pallet rail 31 as shown in FIG. 11. Specifically, the pallet 11 is moved to the end portion of the second pallet rail 31 while in engagement with the auxiliary circulation belt 82 that is provided along the end portion of the second pallet rail 31.

In the second pallet transport step, the pallet 11 placed on the second pallet rail 31 is transported. Specifically, the auxiliary circulation belt 82 is circulated at the same speed as the circulation belt 42 that is provided along the second pallet rail 31 and continuous with the auxiliary circulation belt 82.

Figure 12:
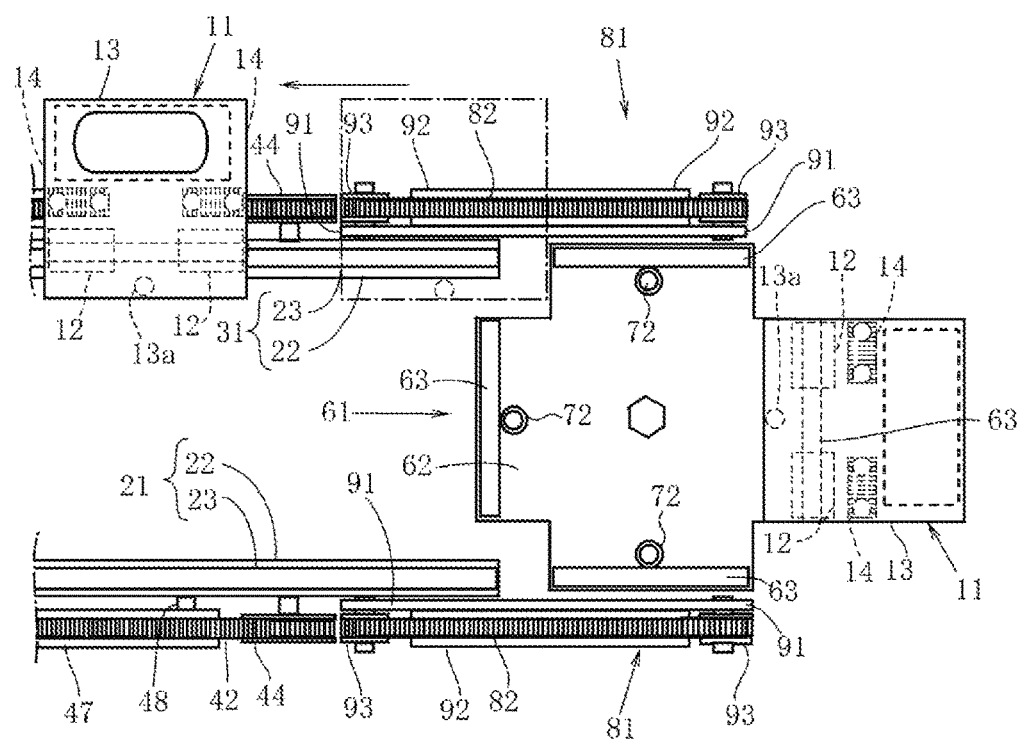
FIG. 12 is a top view showing a state where a pallet placed on a short rail that is continuous with a second pallet rail has been moved to the second pallet rail in correspondence with FIG. 9.

Accordingly, the pallet 11 starts to move from the end portion of the second pallet rail 31 in the opposite direction, and is separated from the end portion of the second pallet rail 31 as shown in FIG. 12. As a result, the pallet 11 is distanced from the auxiliary circulation belt 82 and engages with the circulation belt 42. By circulating the circulation belt 42, the pallet 11 can be transported along the second pallet rail 31.

The pallet 11 is transported along the second pallet rail 31 until it faces the machine tool 3 or 4 provided along the second pallet rail 31. Once the pallet 11 has faced the machine tool 3 or 4, the servomotor 43 is stopped. The workpiece 6 placed on the pallet 11 is processed by the machine tool 3 or 4.

In the present embodiment, the auxiliary circulation belt 82, which is circulated along the end portion of the second pallet rail 31 and the short rail 63 continuous with the end portion of the second pallet rail 31, is provided continuously with the circulation belt 42. Therefore, by circulating the circulation belt 42 and the auxiliary circulation belt 82 separately, the pallet 11 can be maintained at the end portion of the second pallet rail 31 without overlying the circulation belt 42. Specifically, as shown in FIG. 11, after the pallet 11 is moved from the short rail 63 to the end portion of the second pallet rail 31 by circulating the auxiliary circulation belt 82, the circulation of the auxiliary circulation belt 82 is stopped before the pallet 11 reaches the circulation belt 42. As the pallet 11 is not in engagement with the circulation belt 42, the pallet 11 can be maintained at the end portion of the second pallet rail 31 regardless of the circulation of the circulation belt 42.

On the other hand, when in engagement with the circulation belt 42, the pallet 11 is transported on the second pallet rail 31 by circulating the circulation belt 42. That is, the pallet 11 is not moved when it is placed on the end portion of the second pallet rail 31 and is in engagement with the auxiliary circulation belt 82 but is not in engagement with the circulation belt 42. On the other hand, the pallet 11 can be moved when it is placed on the second pallet rail 31 and is in engagement with the circulation belt 42.

When the pallet 11 that is in engagement with the circulation belt 42 and the pallet 11 that is in engagement with the auxiliary circulation belt 82 are distanced from each other by a predetermined pitch, the auxiliary circulation belt 82 is circulated to move the pallet 11 that is in engagement with the auxiliary circulation belt 82, thereby bringing this pallet 11 in engagement with the circulation belt 42. This makes it possible to transport a plurality of pallets 11 on the second pallet rail 31 at the predetermined pitch.

By thus transporting a plurality of pallets 11 at a pitch that is equal to the pitch P between the machine tools 3, 4 (FIG. 1), processing by the plurality of machine tools 3, 4 can be executed simultaneously.

<Second Pallet Moving Step>

In this step, the pallet 11 that has reached the end portion of the second pallet rail 31 is moved to the first pallet rail 21. This movement is carried out by the pallet moving unit 61 that is disposed at the other end portions of the first pallet rail 21 and the second pallet rail 31. As its specific moving procedure is the same as the earlier first pallet moving step, a repetitive description will be omitted.

By carrying out each of the aforementioned steps once in the above-described manner, pallets 11 can be transported, one-by-one, in a counterclockwise direction on a track shaped path.

Every time each of these steps is carried out once, each of the machine tools 1 to 4 is actuated in a state where the operations of the pallet transport device 10 are stopped, and predetermined various types of processing are applied in parallel to non-illustrated workpieces 6 placed on each of the pallets 11. When each of these machine tools 1 to 4 is actuated, a workpiece 6 is imported to or exported from any one of the pallets 11.

As described above, in the pallet transport device 10 according to the present embodiment, the auxiliary circulation belts 82 engage with pallets 11 placed on short rails 63. Therefore, the auxiliary circulation belts 82 can reliably guide the pallets 11 to the short rails 63.

The pallet transport device 10 includes the fluid pressure cylinders (elevator units) 95 that cause the pallet feeding assist units 81 to ascend and descend. By causing the pallet feeding assist units 81 to descend, the engagement between the pallets 11 placed on the short rails 63 and the pallet feeding assist units 81 can be broken. By rotating the rotation plates 62 together with the short rails 63 in this state where the engagement is broken, the pallets 11 can be reliably moved on a semicircular path from the end portion of the first pallet rail 21 to the end portion of the second pallet rail 31.

Thereafter, by causing the pallet feeding assist units 81 to ascend, the auxiliary circulation belts 82 engage again with the pallets 11 placed on the short rails 63. Therefore, each pallet 11 can be reliably moved to the other pallet rail 31 from the short rail 63 that has moved together with the pallet 11 on the semicircular path and is connected to the edge of the other pallet rail 31.

As such, the pallet transport device 10 according to the present embodiment can reliably circulate the pallets 11 on a track shaped path.

The engagement between the pallets 11 and the pallet feeding assist units 81 can be established and broken also by the ascent and descent of the pallets 11. However, in a state where the workpieces 6 are placed on the pallets 11, the pallets 11 have a relatively large weight, and the ascent and descent of the pallets 11 lead to power consumption. Furthermore, along with the ascent and descent of the pallets 11, the workpieces 6 ascend and descend as well. The placing tools 16 on which the workpieces 6 are placed need to bear such ascent and descent. This could complicate the structure of the placing tools 16 for placing the workpieces 6.

In contrast, in the present embodiment, the pallet feeding assist units 81 ascend and descend. Thus, the engagement between the pallets 11 and the pallet feeding assist units 81 can be established and broken using small power. Further-more, as the ascent and descent of the workpieces 6 need not be taken into consideration, the structure of the placing tools 16 for placing the workpieces 6 can be relatively simplified.

On each pallet 11, the workpiece 6 is placed on one side portion of the base 13, whereas the linear-motion blocks 12 are fixed to the other side portion of the base 13. As the linear-motion blocks 12 are supported by the first pallet rail 21 and the second pallet rail 31, each pallet 11 can be circulated on a track shaped path in such a manner that one side portion of the base 13, on which the workpiece 6 is placed, always faces the outer side of the track shaped path. This makes it possible to install the machine tools 1 to 4 for the workpieces 6 on the opposite sides of the pallet transport device 10.

Furthermore, in the pallet transport device 10, the pallets 11 engage with the circulation belts 42 that are arranged endlessly, and are transported along the first pallet rail 21 and the second pallet rail 31. The interval between the plurality of pallets 11 transported along the first pallet rail 21 or the second pallet rail 31 can be changed by changing the positions at which the pallets 11 engage with the circulation belts 42. Specifically, a transport pitch between a pallet 11 that was transported earlier and a pallet 11 that is transported later can easily be changed.

Therefore, even if a transport pitch between the workpieces 6 needs to be changed as a result of changing the machine tools 1 to 4 or the workpieces 6, the change in the pitch can be quickly dealt with without changing the pallets 11 themselves.

In the foregoing embodiment, in order to prevent the first pallet rail 21 from coming into contact with the short rails 63 and impairing the rotation of the rotation plates 62, the predetermined gap d is provided between the first pallet rail 21 and short rails 63 that are continuous with the first pallet rail 21 (FIG. 1). It is preferable that this gap d be as small as possible so as to smoothly move the pallets 11 between the first pallet rail 21 and the short rails 63 that are continuous with the first pallet rail 21. Similarly, it is preferable that the predetermined gap d between the second pallet rail 31 and short rails 63 that are continuous with the second pallet rail 31 be as small as possible.

Figure 13:
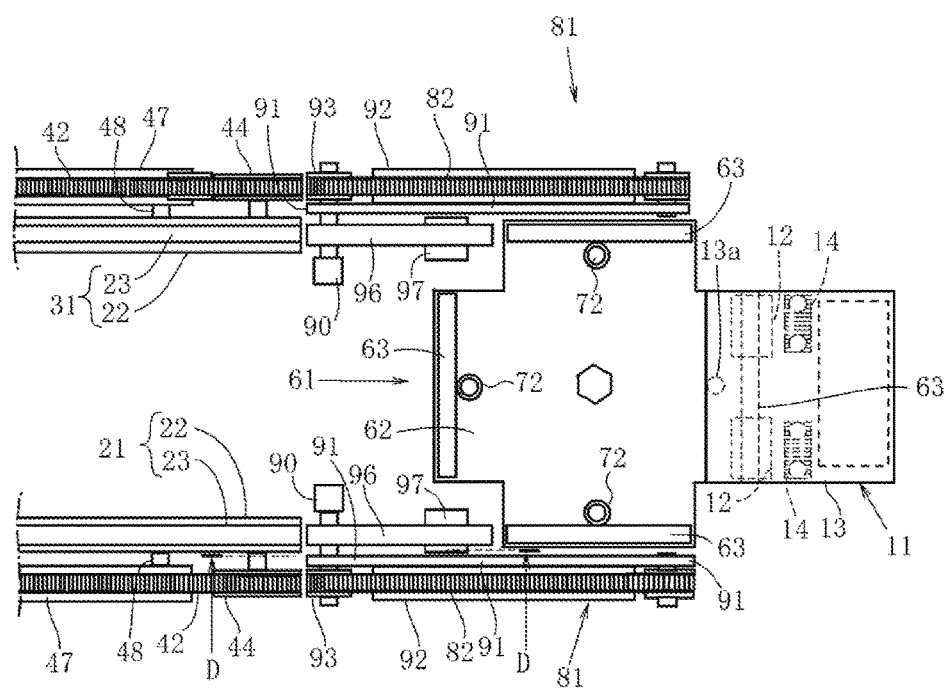
FIG. 13 is a top view showing a modification example in which auxiliary rails are provided between the pallet rails and short rails that are continuous therewith in correspondence with FIG. 9.

When the presence of the predetermined gap d makes it difficult to move the pallets 11 between the first pallet rail 21 or the second pallet rail 31 and the short rails 63, auxiliary rails 96 may be provided therebetween as shown in FIG. 13.

The auxiliary rails 96 are provided along the pallet feeding assist units 81 so as to be continuous with the end portions of the first and second pallet rails 21, 31. More specifically, the auxiliary rails 96 are provided so as to be collinear with the first and second pallet rails 21, 31. The auxiliary rails 96 have substantially the same cross-sectional shape as the linear-motion guide rails 23 of the first and second pallet rails 21, 31 and the short rails 63. The length of the auxiliary rails 96 is substantially the same as the gap between the first pallet rail 21 and a short rail 63 that is continuous with the first pallet rail 21, or the gap between the second pallet rail 31 and a short rail 63 that is continuous with the second pallet rail 31.

Note that when the auxiliary rails 96 are used, the pallet transport device 10 further requires fluid pressure cylinders (auxiliary rail elevator units) 97 that cause the auxiliary rails 96 to ascend and descend. The fluid pressure cylinders 97 cause the auxiliary rails 96 to ascend and descend between a first position at which the auxiliary rails 96 are continuous with the end portions of the first and second pallet rails 21, 31 and a second position that is lower than the first position.

Figure 14:
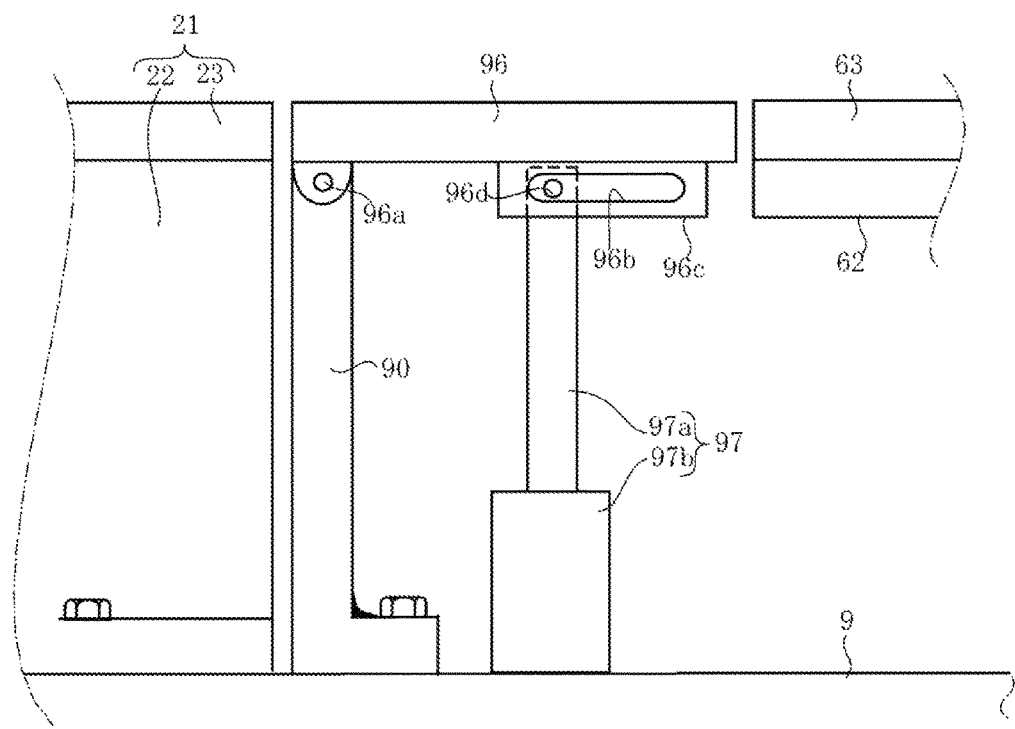
FIG. 14 is a cross-sectional view taken along the line D-D in FIG. 13, and shows a state where a pallet rail and a short rail have been made continuous with each other by the ascent of an auxiliary rail.
Figure 15:
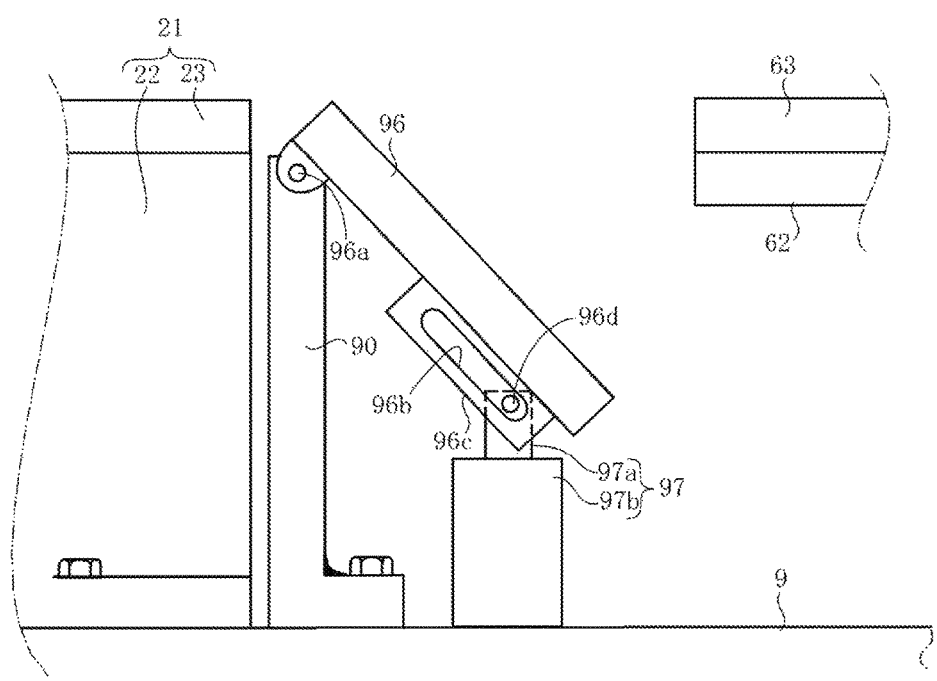
FIG. 15 shows a state where rotation of a rotation plate is permitted by the descent of an auxiliary rail in correspondence with FIG. 14.

As shown in FIGS. 14 and 15, each auxiliary rail 96 according to the present embodiment has a supporting point 96a at one end portion thereof near the first pallet rail 21 or the second pallet rail 31, and the other end thereof opposing a short rail 63 ascends and descends using the supporting point 96a as a rotation axis.

Specifically, together with one end of an auxiliary plate 91 (FIG. 13), the supporting point 96a of the auxiliary rail 96 is rotatably supported by an upper end of a rotational support pillar 90 by which one end of the auxiliary plate 91 is rotatably supported. Main bodies 97b of the fluid pressure cylinders 97 are fixed to the rack 9 with projectable/retractable rods 97a facing upward. The other ends of the auxiliary rails 96 are rotatably supported by the upper ends of the projectable/retractable rods 97a.

As shown in FIG. 14, the fluid pressure cylinders 97 are configured in such a manner that, in a state where the projectable/retractable rods 97a project upward, the auxiliary rails 96 fill the gaps between the linear-motion guide rails 23 of the first and second pallet rails 21, 31 and short rails 63 that are continuous therewith, thereby making the linear-motion guide rails 23 continuous with the short rails 63.

Locking plates 96c are attached to lower surfaces of the other ends of the auxiliary rails 96. The locking plates 96c have long holes 96b that extend in a longitudinal direction. The upper ends of the projectable/retractable rods 97a of the fluid pressure cylinders 97 are rotatably supported by the long holes 96b via pins 96d. When the projectable/retractable rods 97a are retracted into the main bodies 97b, the pins 96d cause the other ends of the auxiliary rails 96 to descend while moving inside the long holes 96b as shown in FIG. 15.

In the state shown in FIG. 14, the auxiliary rails 96 fill the gaps between the linear-motion guide rails 23 of the first and second pallet rails 21, 31 and short rails 63 that are continuous therewith. The auxiliary rails 96 make it easy to move the pallets 11 from the first pallet rail 21 or the second pallet rail 31 to a short rail 63 that is continuous with the first pallet rail 21 or the second pallet rail 31, or to move the pallets 11 from the short rail 63 to the first pallet rail 21 or the second pallet rail 31.

When the auxiliary rails 96 fill the gaps between the linear-motion guide rails 23 of the first and second pallet rails 21, 31 and short rails 63 that are continuous therewith, the short rails 63 cannot move toward the auxiliary rails 96. That is, free rotation of the rotation plates 62 provided with short rails 63 is restricted.

As shown in FIG. 15, the descent of the other ends of the auxiliary rails 96 opposing short rails 63 enables the short rails 63 to move toward the auxiliary rails 96. This permits rotation of the rotation plates 62, which include the short rails 63 on which the pallets 11 are placed.

Such auxiliary rails 96 and fluid pressure cylinders 97 can not only reliably move the pallets 11 from the first pallet rail 21 or the second pallet rail 31 to a short rail 63, or from a short rail 63 to the first pallet rail 21 or the second pallet rail 31, but also permit free rotation of the rotation plates 62.

Figure 16:
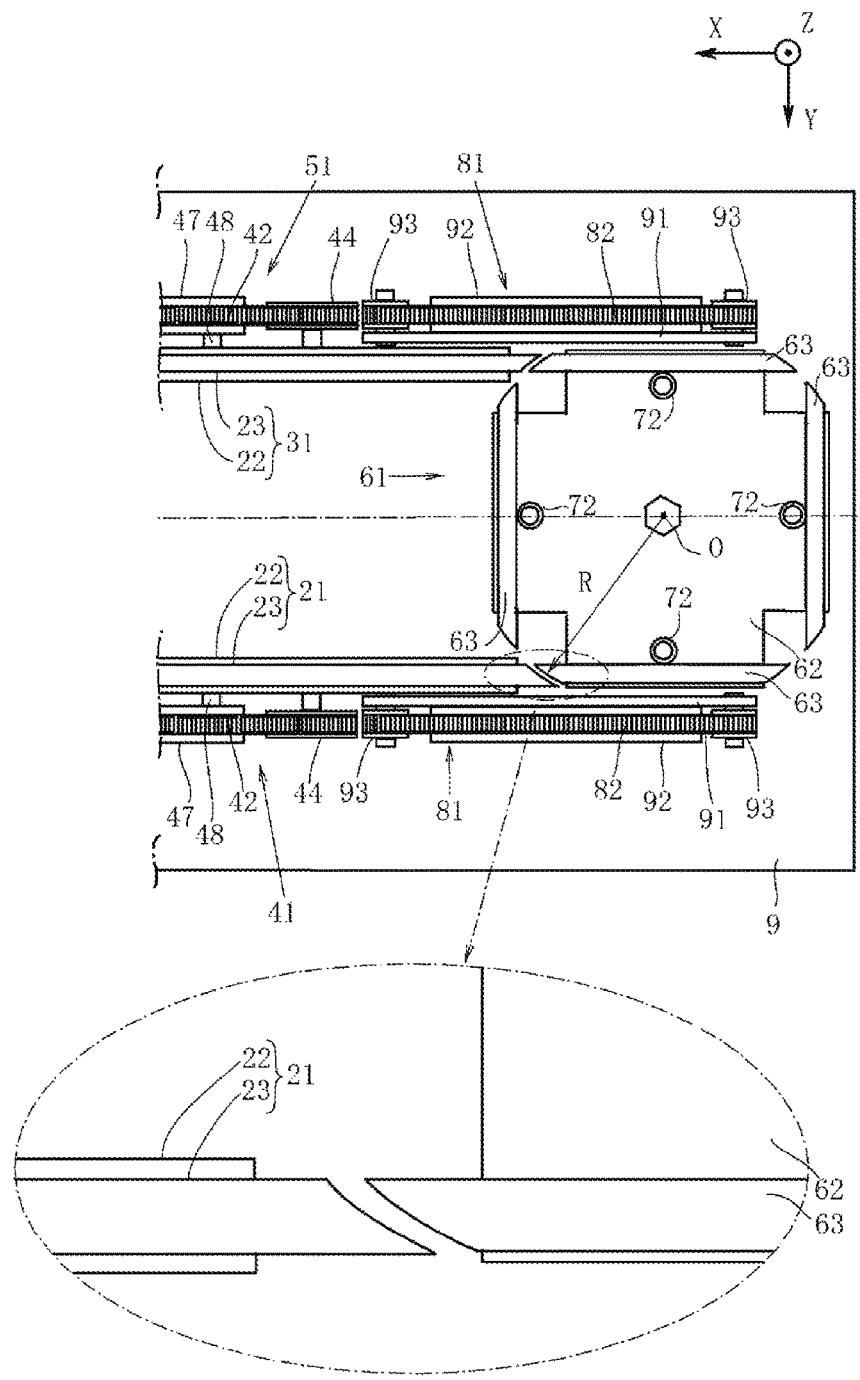
FIG. 16 is a top view showing a modification example in which curved-surface processing has been applied to opposing surfaces of the end portions of the pallet rails and the end portions of short rails that are continuous therewith in correspondence with FIG. 9.

It should be noted that as a method for minimizing the gap d (see FIG. 1) in order to smoothly move the pallets 11 between the first pallet rail 21 or the second pallet rail 31 and a short rail 63 that is continuous therewith without using the aforementioned auxiliary rails 96 and fluid pressure cylinders 97, it is also possible to apply curved-surface processing to opposing surfaces of the end portions of the first pallet rail 21 and the second pallet rail 31 and the end portions of short rails 63 that are continuous therewith as shown in FIG. 16. In this case, it is preferable that the resultant curvature R given by the curved-surface processing is the same as the curvature of the rotation circles of the rotation plates 62.

As shown in FIG. 16, it is possible to eliminate the gap in the X-axis direction between the first pallet rail 21 or the second pallet rail 31 and a short rail 63 that is continuous therewith by applying the curved-surface processing with the same curvature R as the rotation circles of the rotation plates 62 to the end portion of the short rail 63 and by applying the curved-surface processing also to the end portions of the first pallet rail 21 and the second pallet rail 31 opposing the end portion of the short rail 63. By applying the curved-surface processing with the same curvature R as the rotation circles of the rotation plates 62 to these edges, the interference between the short rails 63 and the pallet rails 21, 31 during rotation of the rotation plates 62 is avoided and free rotation of the rotation plates 62 is enabled, even though the foregoing gaps are eliminated.

The description of the foregoing embodiment pertains to a case where the first pallet rail 21 and the second pallet rail 31, which are arranged in parallel to each other with a predetermined interval in the horizontal direction, are provided as a plurality of pallet rails on which pallets are movably placed in the circulation-type pallet transport device. However, provided that any pallet circulation method can be used, a plurality of pallet rails can be arranged at a predetermined interval in the horizontal direction in such a manner that the plurality of pallet rails together forms a right angle or a predetermined angle. In this case, short rails are not limited to being provided in the aforementioned mode in which a pair of short rails opposes each other, and it is sufficient to provide a plurality of short rails that are parallel to a tangent T to the rotation circumferences of the pallet moving units (FIG. 1).

In the foregoing embodiment, each of the first and second pallet feeding units 41, 51 includes the circulation belt 42 and the circulation mechanism (servomotor 43) that circulates the circulation belt 42. The first and second pallet feeding units 41, 51 are not limited to this mode, and may be configured in a different manner as long as the pallets 11 can be transported along the first and second pallet rails 21, 31.

In the foregoing embodiment, in each pallet moving unit 61, two pairs of short rails 63 are provided, and a pair of short rails 63 opposes each other on the rotation circumference of the rotation plate 62. These two pairs of short rails 63 may be replaced by one, three, four, five, or more pairs of short rails 63. Increasing the number of pairs of short rails 63 can reduce the rotation angle of the rotation plates 62 of the pallet moving units 61 in moving the pallets 11.

In the foregoing embodiment, the rotation plates 62 of the pallet moving units 61 are formed in a shape of a cross when viewed from above. The rotation plates 62 may have a shape of a circular plate, a polygon, or a rod when viewed from above. The rotation plates 62 may have any shape as long as one or more short rails 63 are provided in parallel with a tangent T to the rotation circumferences of the pallet moving units 61.

In the foregoing embodiment, the pallets 11 are circulated in the counterclockwise direction. Each pallet 11 can also be transported in a clockwise direction instead of the counterclockwise direction.

The description of the foregoing embodiment pertains to a case where the pallet feeding assist units 81 and the auxiliary rails 96 ascend and descend as they are rotated so as to lower one side thereof. They may ascend and descend in parallel without being rotated.

The description of the foregoing embodiment pertains to a case where the placing tool 16 for placing a workpiece 6 is mounted on an upper surface of one side portion of each base 13. However, although not illustrated, the placing tool 16 may be provided in a through hole formed in each base 13, and a workpiece 6 may be placed in such a manner that it penetrates each base 13 via this through hole.

Below is a comprehensive description of the configurations, functions, and advantageous effects of the present embodiment.

In the present embodiment, the pallet transport device includes a plurality of pallet rails on which a pallet is movably placed, a pallet feeding unit that transports the pallet along the pallet rails, and a pallet moving unit that is disposed at end portions of the plurality of pallet rails and horizontally rotates so as to move the pallet placed on one of the plurality of pallet rails to the other pallet rail.

The pallet transport device further includes one or more short rails disposed at a periphery of the pallet moving unit, a pallet feeding assist unit that moves the pallet from the pallet rails to the short rails, or moves the pallet from the short rails to the pallet rails, and an elevator unit that causes the pallet feeding assist unit to descend and ascend. The horizontal rotation of the pallet moving unit is permitted by the descent of the pallet feeding assist unit.

It is preferable that the plurality of pallet rails are arranged in parallel to each other at a predetermined interval in a horizontal direction, and the short rails are provided in pairs so as to oppose each other on a rotation circumference of the pallet moving unit and such that the pair of short rails are provided in a plurality.

In this case, the following configuration is preferable. The pallet feeding assist unit includes an auxiliary circulation belt that is arranged endlessly and circulated along the end portions of the pallet rails and a short rail continuous with the pallet rails. The auxiliary circulation belt has recesses and projections that extend in a width direction and are formed continuously in an alternating manner in a longitudinal direction. Recesses and projections capable of engaging with the recesses and projections of the auxiliary circulation belt are formed on a lower surface of the pallet. The ascent of the pallet feeding assist unit brings the recesses and projections of the pallet into engagement with the recesses and projections of the auxiliary circulation belt, and moves the pallet along with the circulation of the auxiliary circulation belt. The descent of the pallet feeding assist unit makes the recesses and projections of the auxiliary circulation belt separated from the recesses and projections of the pallet.

It is preferable that the short rails are arranged in parallel with a tangent to the rotation circumference of the pallet moving unit. The pallet feeding assist unit may have a supporting point at one end portion thereof near the pallet feeding unit, and the other end thereof may ascend and descend using the supporting point as a rotation axis.

The pallet transport device may further include auxiliary rails provided along the pallet feeding assist unit so as to be continuous with the end portions of the pallet rails and be collinear with the pallet rails, and an auxiliary rail elevator unit causes the auxiliary rails to ascend and descend between a first position continuous with the end portions of the pallet rails and a second position lower than the first position. In this case, the auxiliary rails may have a supporting point at one end portion thereof near the pallet rails, and the other end thereof may ascend and descend using the supporting point as a rotation axis.

The pallet transport device according to the present embodiment includes one or more short rails that are disposed at the periphery of the pallet moving unit, the pallet feeding assist unit that moves the pallet from the pallet rails to the short rails or moves the pallet from the short rails to the pallet rails, and the elevator unit that causes the pallet feeding assist unit to ascend and descend. Horizontal rotation of the pallet moving unit is permitted by the descent of the pallet feeding assist unit.

Therefore, even if the pallet feeding assist unit engages with the pallet placed on the short rails, the engagement between the pallet and the pallet feeding assist unit can be broken by permitting the rotation of a rotation plate through the descent of the pallet feeding assist unit.

Furthermore, rotating the rotation plate together with the short rails enables the pallet on the short rails to move on a semicircular path to the other pallet rail. In this movement, a movement of the pallet relative to the short rails can be restricted by providing a pallet locking mechanism.

By causing the pallet feeding assist unit to ascend, the pallet feeding assist unit engages again with the pallet placed on the short rails. Therefore, the pallet can be moved to the other pallet rail again from a short rail that has moved together with the pallet on the semicircular path and is connected to the edge of the other pallet rail. In this way, the pallet can be reliably circulated on a track shaped path.

The embodiments of the present invention described above are merely illustration of some application examples of the present invention and not of the nature to limit the technical scope of the present invention to the specific constructions of the above embodiments.

The present application claims a priority based on Japanese Patent Application No. 2015-176314 filed with the Japan Patent Office on Sep. 8, 2015, all the contents of which are hereby incorporated by reference.

The invention claimed is:

1. A pallet transport device comprising:
   a plurality of pallet rails configured to allow a pallet to be movably placed thereon;
   a pallet feeding unit configured to transport the pallet along the pallet rails;
   a pallet moving unit disposed at end portions of the plurality of pallet rails, the pallet moving unit being configured to horizontally rotate so as to move the pallet from one of the plurality of pallet rails to an other one of the plurality of pallet rails;
   one or more short rails disposed at a periphery of the pallet moving unit;
   a pallet feeding assist unit configured to, by ascending or descending, move the pallet from a respective one of the pallet rails to a respective one of the short rails, or move the pallet from a respective one of the short rails to a respective one of the pallet rails; and
   an elevator unit configured to cause the pallet feeding assist unit to descend and ascend, wherein
   the horizontal rotation of the pallet moving unit is permitted by a descent of the pallet feeding assist unit, and
   the pallet feeding assist unit is configured to
      engage with a lower surface of the pallet to move the pallet when the pallet feeding assistant unit ascends, and
      disengage with the lower surface of the pallet when the pallet feeding assistant unit descends.

2. The pallet transport device according to claim 1, wherein
the plurality of pallet rails are arranged in parallel to each other at a predetermined interval in a horizontal direction, and
the short rails are provided in pairs so as to oppose each other on a rotation circumference of the pallet moving unit, the pair of short rails being provided in a plurality.

3. The pallet transport device according to claim 1, wherein
the plurality of pallet rails are disposed so as to together form a right angle or a predetermined angle at a predetermined interval in a horizontal direction, and the short rails are provided in a plurality on a rotation circumference of the pallet moving unit.

4. The pallet transport device according to claim 1, wherein
the pallet feeding assist unit includes an endless auxiliary circulation belt endlessly arranged along an end portion of a corresponding one of the pallet rails and along a corresponding one of the short rails, the corresponding one of the pallet rails and the corresponding one of the short rails being in alignment,
the auxiliary circulation belt has recesses and projections extending in a width direction of the endless auxiliary circulation belt and being continuously formed in an alternating manner in a longitudinal direction of the auxiliary circulation belt,
recesses and projections capable of engaging with the recesses and projections of the auxiliary circulation belt are formed on a lower surface of the pallet,
the ascent of the pallet feeding assist unit brings the recesses and projections of the pallet into engagement with the recesses and projections of the auxiliary circulation belt, and moves the pallet along with the circulation of the auxiliary circulation belt, and
the descent of the pallet feeding assist unit makes the recesses and projections of the auxiliary circulation belt separated from the recesses and projections of the pallet.

5. The pallet transport device according to claim 1, wherein
the short rails are each arranged in parallel to a tangent to a rotation circumference of the pallet moving unit.

6. The pallet transport device according to claim 1, wherein
the pallet feeding assist unit has a supporting point at one end portion thereof near the pallet feeding unit, and the other end thereof ascends and descends using the supporting point as a rotation axis.

7. The pallet transport device according to claim 1, further comprising:
auxiliary rails each provided along the pallet feeding assist unit so as to be in alignment with an end portion of a corresponding one of the pallet rails, the auxiliary rails each being collinear with a corresponding one of the pallet rails; and
an auxiliary rail elevator unit configured to cause each of the auxiliary rails to ascend and descend between a first position and a second position lower than the first position, the first position being in alignment with an end portion of a corresponding one of the pallet rails.

8. The pallet transport device according to claim 7, wherein
the auxiliary rails have a supporting point at one end portion thereof near the pallet rails, and the other end thereof ascends and descends using the supporting point as a rotation axis.

9. A pallet transport device, comprising:
a plurality of pallet rails configured to allow a pallet to be movably placed thereon;
a pallet feeding unit configured to transport the pallet along the pallet rails;
a pallet moving unit disposed at end portions of the plurality of pallet rails, the pallet moving unit being configured to horizontally rotate so as to move the pallet placed on any one of the plurality of pallet rails to the other pallet rail;
one or more short rails disposed at a periphery of the pallet moving unit;
a pallet feeding assist unit configured to move the pallet from the pallet rails to the short rails, or move the pallet from the short rails to the pallet rails; and
an elevator unit configured to cause the pallet feeding assist unit to descend and ascend, wherein
the horizontal rotation of the pallet moving unit is permitted by the descent of the pallet feeding assist unit,
the plurality of pallet rails are arranged in parallel to each other at a predetermined interval in a horizontal direction, and
the short rails are provided in pairs so as to oppose each other on a rotation circumference of the pallet moving unit, the pair of short rails being provided in a plurality.

10. A pallet transport device, comprising:
a plurality of pallet rails configured to allow a pallet to be movably placed thereon;
a pallet feeding unit configured to transport the pallet along the pallet rails;
a pallet moving unit disposed at end portions of the plurality of pallet rails, the pallet moving unit being configured to horizontally rotate so as to move the pallet placed on any one of the plurality of pallet rails to the other pallet rail;
one or more short rails disposed at a periphery of the pallet moving unit;
a pallet feeding assist unit configured to move the pallet from the pallet rails to the short rails, or move the pallet from the short rails to the pallet rails;
an elevator unit configured to cause the pallet feeding assist unit to descend and ascend;
auxiliary rails provided along the pallet feeding assist unit so as to be in alignment with the end portions of the pallet rails, the auxiliary rails being collinear with the pallet rails; and
an auxiliary rail elevator unit configured to cause the auxiliary rails to ascend and descend between a first position and a second position lower than the first position, the first position being in alignment with the end portions of the pallet rails, wherein
the horizontal rotation of the pallet moving unit is permitted by the descent of the pallet feeding assist unit.

* * * * *